United States Patent
Moteki et al.

(10) Patent No.: US 9,892,516 B2
(45) Date of Patent: Feb. 13, 2018

(54) THREE-DIMENSIONAL COORDINATE COMPUTING APPARATUS, THREE-DIMENSIONAL COORDINATE COMPUTING METHOD, AND NON-TRANSITORY COMPUTER READABLE RECORDING MEDIUM HAVING THEREIN PROGRAM FOR THREE-DIMENSIONAL COORDINATE COMPUTING

(71) Applicant: FUJITSU LIMITED, Kawasaki-shi, Kanagawa (JP)

(72) Inventors: Atsunori Moteki, Kawasaki (JP); Nobuyasu Yamaguchi, Kawasaki (JP); Takahiro Matsuda, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 117 days.

(21) Appl. No.: 14/845,493

(22) Filed: Sep. 4, 2015

(65) Prior Publication Data

US 2016/0093058 A1 Mar. 31, 2016

(30) Foreign Application Priority Data

Sep. 26, 2014 (JP) .................................. 2014-196531

(51) Int. Cl.
*G06T 7/73* (2017.01)
*G06T 7/593* (2017.01)
(Continued)

(52) U.S. Cl.
CPC .......... *G06T 7/0075* (2013.01); *G06K 9/4604* (2013.01); *G06T 7/579* (2017.01);
(Continued)

(58) Field of Classification Search
CPC ......... G06T 7/0075; G06T 7/73; G06T 7/579; G06T 7/593; G06T 2207/30244;
(Continued)

(56) References Cited

U.S. PATENT DOCUMENTS

| 2006/0004280 A1 | 1/2006 | Kotake et al. |
| 2008/0069405 A1 | 3/2008 | Endo et al. |
| 2013/0148851 A1* | 6/2013 | Leung .................. G06K 9/3241 382/103 |

FOREIGN PATENT DOCUMENTS

| JP | 2005-326274 | 11/2005 |
| JP | 2008-70267 | 3/2008 |

(Continued)

OTHER PUBLICATIONS

Lakemond, Ruan, Clinton Fookes, and Sridha Sridharan. "Evaluation of two-view geometry methods with automatic ground-truth generation." Image and Vision Computing 31.12 (2013): 921-934.*

(Continued)

*Primary Examiner* — Bhavesh Mehta
*Assistant Examiner* — Menatoallah Youssef
(74) *Attorney, Agent, or Firm* — Staas & Halsey LLP

(57) ABSTRACT

A three-dimensional coordinate computing apparatus includes an image selecting unit and a coordinate computing unit. The image selecting unit selects a first selected image from multiple captured images, and selects a second selected image from multiple subsequent images captured by the camera after the first selected image has been captured. The second selected image is selected based on a distance between a position of capture of the first selected image and a position of capture of each of the multiple subsequent images and the number of corresponding feature points, each of which corresponds to one of feature points extracted from the first selected image and one of feature points extracted from each of the multiple subsequent images. The coordinate computing unit computes three-dimensional coordinates of the multiple corresponding feature points based on two-dimensional coordinates of each corresponding feature point in the first and second selected images.

10 Claims, 13 Drawing Sheets

(51) Int. Cl.
  *G06T 7/579* (2017.01)
  *G06K 9/46* (2006.01)
  *G06T 7/00* (2017.01)

(52) U.S. Cl.
  CPC ............... *G06T 7/593* (2017.01); *G06T 7/73* (2017.01); *G06T 2207/30208* (2013.01); *G06T 2207/30244* (2013.01)

(58) Field of Classification Search
  CPC ........... G06T 2207/30208; G06T 2207/30204; G06K 9/4604
  See application file for complete search history.

(56) References Cited

FOREIGN PATENT DOCUMENTS

| | | |
|---|---|---|
| JP | 2009-48516 | 3/2009 |
| JP | 2009-237848 | 10/2009 |
| JP | 2013-127783 | 6/2013 |
| WO | 2013/137733 A1 | 9/2013 |

OTHER PUBLICATIONS

Wendel, Andreas, et al. "Dense reconstruction on-the-fly." Computer Vision and Pattern Recognition (CVPR), 2012 IEEE Conference on. IEEE, 2012.*

Georg Klein et al., "Parallel Tracking and Mapping for Small AR Workspaces", 6th IEEE and ACM International Symposium an Mixed and Augmented Reality (ISMAR) 2007, pp. 225-234, Nov. 2007.

Kento Yamada et al., "Latest Algorithm for 3-D Reconstruction from Two Views", Information Processing Society of Japan Study Report, vol. 2009-CVIM-168-15, pp. 1-8, 2009.

Hirokazu Kato et al., "An Augmented Reality System and its Calibration based on Marker Tracking", 10 pp., TVRSJ vol. 4, No. 4, 1999.

Edward Rosten et al., "Machine Learning for High-Speed Corner Detection", Computer Vision-ECCV 2006, Lecture Notes in Computer Science vol. 3951, pp. 430-443, 2006.

Bruce D. Lucas et al., "An Iterative Image Registration Technique with an Application to Stereo Vision", From *Proceedings of Imaging Understanding Workshop*, pp. 121-130, 1981.

Richard I. Hartley et al., "Triangulation", Computer Vision and Image Understanding, vol. 68, No. 2, November, pp. 146-157, 1997.

Extended European Search Report dated Feb. 9, 2016 in related European Application No. 15184453.7.

Andreas Wendel et al., "Dense Reconstruction On-the-Fly", Computer Vision and Pattern Recognition (CVPR), Jun. 16, 2012, pp. 1450-1457.

Ruan Lakemond et al., "Evaluation of two-view geometry methods with automatic ground-truth generation", *Image and Vision Computing*, vol. 31, No. 12, 2013, pp. 921-934.

European Office Action dated Jul. 6, 2017 in related European Patent Application No. 15 184 453.7.

Lucas Teixeira et al., "Indoor Localization using SLAM in parallel with a Natural Marker Detector", Applied Computing, ACM, 2 Penn Plaza, Suite 701 New York NY 10121-0701 USA, XP058016534, DOI: 10.1145/2480362.2480370, ISBN: 978-1-4503-1656-9, pp. 27-33, Mar. 18, 2013.

David M. Chen et al., "Streaming Mobile Augmented Reality on Mobile Phones", ISMAR 2009, 8th IEEE International Symposium on Mixed and Augmented Reality 2009, IEEE, Piscataway, NJ, USA, XP031568921, ISBN: 978-1-4244-5419-8/09, pp. 181-182, Oct. 19, 2009.

\* cited by examiner

| TIME | POSITION AND ATTITUDE INFORMATION $(t_1, t_2, t_3, r_1, r_2, r_3)$ | MARKER COORDINATE INFORMATION | SELECTION FLAG |
|---|---|---|---|
| 0 | (13.4, 20.2, 403.9, 0.24, 0.34, 0.55) | (243, 112) (293, 112) (293, 162) (243, 262) | FALSE |
| 1 | (13.6, 20.4, 403.7, 0.26, 0.33, 0.52) | (242, 111) (291, 114) (290, 163) (241, 263) | TRUE |
| 2 | (13.8, 20.6, 403.6, 0.29, 0.31, 0.54) | (240, 110) (290, 115) (288, 164) (243, 264) | FALSE |
| ... | ... | ... | ... |

| FEATURE POINT NUMBER | COORDINATES IN FIRST IMAGE | COORDINATES IN SUBSEQUENT IMAGE | TRACKING FLAG |
|---|---|---|---|
| 0 | (265.3, 397.6) | (295.1, 427.9) | TRUE |
| 1 | (412.9, 366.1) | (442.3, 398.2) | TRUE |
| 2 | (208.8, 211.3) | — | FALSE |
| ... | ... | ... | ... |

THREE-DIMENSIONAL COORDINATE COMPUTING APPARATUS, THREE-DIMENSIONAL COORDINATE COMPUTING METHOD, AND NON-TRANSITORY COMPUTER READABLE RECORDING MEDIUM HAVING THEREIN PROGRAM FOR THREE-DIMENSIONAL COORDINATE COMPUTING

CROSS-REFERENCE TO RELATED APPLICATION

This application is based upon and claims the benefit of priority of the prior Japanese Patent Application No. 2014-196531, filed on Sep. 26, 2014, the entire contents of which are incorporated herein by reference.

FIELD

The embodiments discussed herein are related to a three-dimensional coordinate computing apparatus, a three-dimensional coordinate computing method, and a non-transitory computer readable recording medium having therein a program for three-dimensional coordinate computing.

BACKGROUND

There is known an augmented reality (AR) technology that displays a virtual image in superimposition at a predetermined position on a captured image of a real-world space. The AR technology is widely used as supporting work of a worker in a workspace such as a factory by displaying work support information that indicates the content of work, the location of a work target, and the like in superimposition on a captured image.

In the AR technology, it is necessary to accurately obtain the position and the attitude of a camera in the real-world space so as to superimpose a virtual image at an appropriate position on the captured image. An example of the method is a method of estimating the position and the attitude of the camera by measuring in advance the three-dimensional coordinates of a feature point on a target object that is a display target of the virtual image, registering the three-dimensional coordinates on a feature point map, and associating the feature point registered on the feature point map with a feature point that is extracted from the captured image.

An example of the method for computing the three-dimensional coordinates registered on the feature point map is a method in which the target object is captured as two images from two arbitrary points of view, feature points are extracted from each image, and the three-dimensional coordinates of the corresponding feature points between the images are computed based on the coordinates of the feature points in each image by using the principle of triangulation.

The following technologies are also relevant to AR. A technology is suggested that determines whether a selected image is appropriate based on the number of feature points, of which the three-dimensional position is estimated, in the selected image and the angle of intersection between light rays that connect the estimated three-dimensional position of the corresponding feature points included in the selected image and the position of feature points in an image frame. A technology is also suggested that determines the reconstruction position of a marker in a three-dimensional space based on the position of image features in a first image and a second image and the attitude of the camera which captures each image. The technology selects at least one of the images as a key image when a reconstruction error based on the reconstruction position and a predetermined position of the marker in the three-dimensional space satisfies a predetermined standard.

Examples of related art include Japanese Laid-open Patent Publication No. 2009-237848 and Japanese Laid-open Patent Publication No. 2013-127783.

Examples of related art include G. Klein et al., "Parallel Tracking and Mapping for Small AR Workspace", *6th IEEE and ACM International Symposium on Mixed and Augmented Reality (ISMAR)* 2007, pp. 225-234, November 2007 and Kento Yamada et al. "Latest Algorithm for 3-D Reconstruction from Two Views", *Information Processing Society of Japan Study Report*, vol. 2009-CVIM-168-15, pp. 1-8, 2009.

SUMMARY

According to an aspect of the invention, a three-dimensional coordinate computing apparatus includes an image selecting unit that selects a first selected image from multiple captured images, the multiple captured images being captured by a camera, and selects a second selected image from multiple subsequent images, the multiple subsequent images being captured by the camera after the first selected image has been captured, wherein the selecting the second selected image is performed based on a distance and a number of corresponding feature points, the distance being between a position of capture of the first selected image which is computed based on first marker position information which indicates a position of a marker in the first selected image and a position of capture of each of the multiple subsequent images which is computed based on second marker position information which indicates a position of the marker in each of the multiple subsequent images, and the number of corresponding feature points, each of the corresponding feature points being corresponding one of feature points extracted from the first selected image and one of feature points extracted from each of the multiple subsequent images; and a coordinate computing unit that computes three-dimensional coordinates of the multiple corresponding feature points based on two-dimensional coordinates of each corresponding feature point in each of the first selected image and the second selected image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a position and attitude information table;

FIG. 7 is a diagram illustrating an example of a feature point information table;

DESCRIPTION OF EMBODIMENTS

The accuracy of computing the three-dimensional coordinates of the feature point registered on the feature point map may be decreased depending on the position and the direction of capture of the two images used in the computation of the three-dimensional coordinates. Conditions for the appropriate position and the direction of capture of the two images are determined by the principle of triangulation. However, a problem arises in that it is difficult to capture the two images with an appropriate position and a direction because a user who tries to register the feature point map usually does not know the details of the principle of triangulation. When an image is displayed in superimposition by using a low-quality feature point map that is created by using two images captured with an inappropriate position and a direction, the accuracy of the position of display of the image may be decreased.

Accordingly, it is desired to provide a three-dimensional coordinate computing apparatus, a three-dimensional coordinate computing method, and a three-dimensional coordinate computing program, all of which are capable of computing the three-dimensional coordinates of a feature point with high accuracy.

Hereinafter, embodiments will be described with reference to the drawings.

First Embodiment

Figure 1:
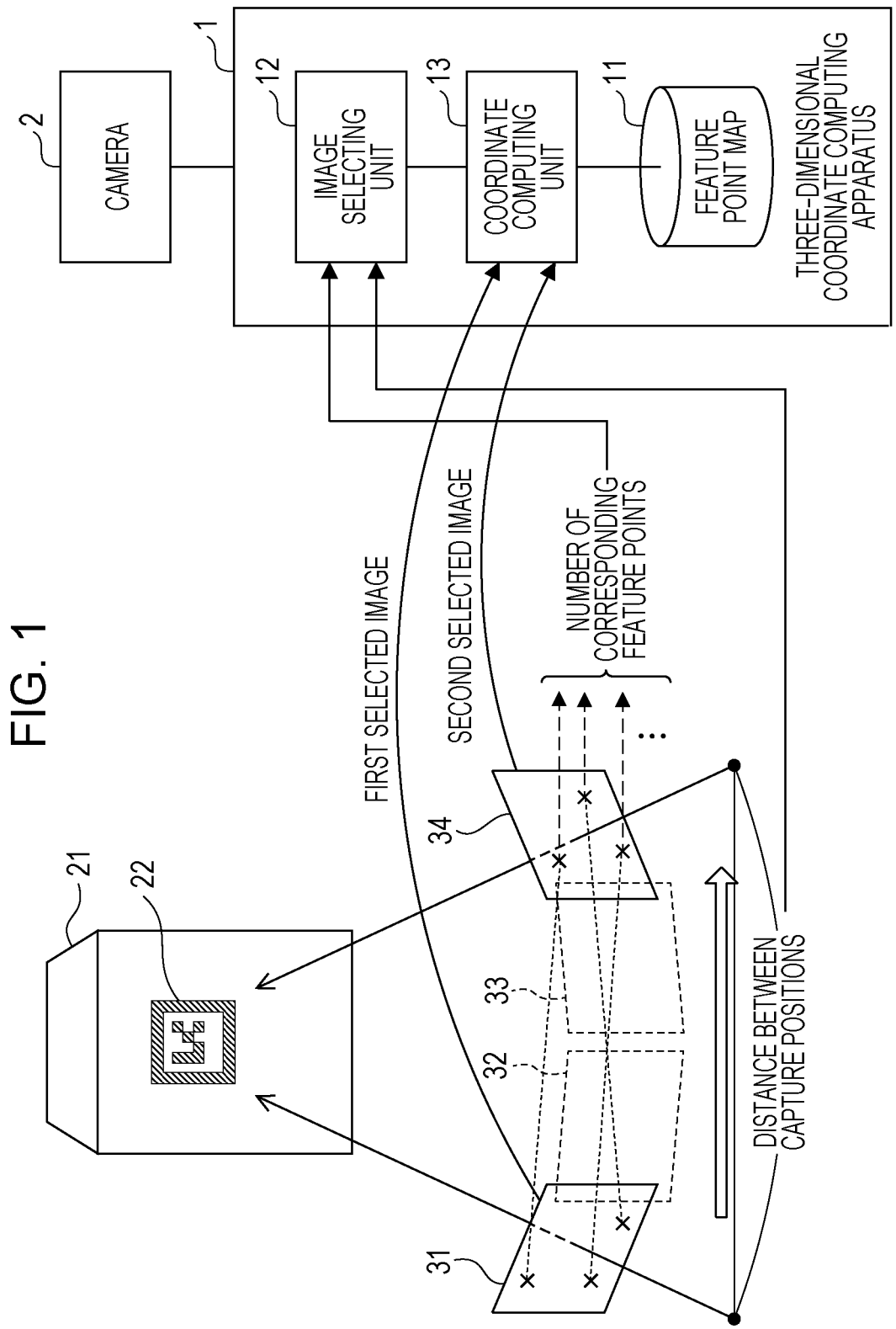
FIG. 1 is a diagram illustrating a configuration example and a process example of a three-dimensional coordinate computing apparatus according to a first embodiment.

FIG. 1 is a diagram illustrating a configuration example and a process example of a three-dimensional coordinate computing apparatus according to a first embodiment. The three-dimensional coordinate computing apparatus illustrated in FIG. 1 is an apparatus that is intended to compute the three-dimensional coordinates of multiple feature points. The three-dimensional coordinates of multiple feature points computed by a three-dimensional coordinate computing apparatus 1, for example, are registered on a feature point map 11. The feature point map 11 is referred to when a virtual image is displayed in superimposition at a predetermined position on a target object 21.

The displaying in superimposition by using the feature point map 11 is performed by a markerless method that does not use a marker. Meanwhile, in the present embodiment, a marker 22 is arranged on the surface or in the vicinity of the target object 21. The three-dimensional coordinate computing apparatus 1 creates the feature point map 11 by using a captured image of the marker 22 captured by a camera 2. Using the marker 22 in the creation of the feature point map 11 enables the position and the direction of capture of each captured image to be specified through image processing. The three-dimensional coordinate computing apparatus 1 automatically selects two appropriate images used for computing the three-dimensional coordinates of a feature point by using the specified position and the direction of capture.

The three-dimensional coordinate computing apparatus 1 is provided with an image selecting unit 12 and a coordinate computing unit 13. Processes of the image selecting unit 12 and the coordinate computing unit 13 are realized by, for example, a processor provided in the three-dimensional coordinate computing apparatus 1 executing a predetermined program. The image selecting unit 12 and the coordinate computing unit 13 perform the following process by using a captured image that is captured by the camera 2 connected to the three-dimensional coordinate computing apparatus 1. As another example, the image selecting unit 12 and the coordinate computing unit 13 may perform the following process by obtaining multiple captured images from another apparatus. The camera 2 may be integrally mounted on the three-dimensional coordinate computing apparatus 1.

The image selecting unit 12 selects a first selected image from multiple captured images captured by the camera 2. In the example of FIG. 1, a captured image 31 is selected as the first selected image.

The image selecting unit 12 also selects a second selected image from multiple subsequent images captured by the camera 2 after the first selected image through the following process. The image selecting unit 12 computes the position of capture of the first selected image based on the position information of the marker 22 in the first selected image. The image selecting unit 12 also computes the position of capture of each subsequent image based on the position information of the marker 22 in each subsequent image. Then, the image selecting unit 12 computes the distance between the position of capture of the first selected image and the position of capture of each subsequent image for each combination of the first selected image and the subsequent images. The image selecting unit 12 further computes the number of corresponding feature points between feature points extracted from the first selected image and feature points extracted from each subsequent image for each combination of the first selected image and the subsequent images.

The image selecting unit 12 selects the second selected image from multiple subsequent images based on the distance between the positions of capture and the number of corresponding feature points. In the example of FIG. 1, a captured image 34 is selected as the second selected image from captured images 32 to 34 that are captured after the captured image 31.

The two images used in the computation of the three-dimensional coordinates are desirably captured at positions separated by a certain distance so as to accurately compute the three-dimensional coordinates of a feature point. The image selecting unit 12 may select as the second selected image the subsequent image that is captured at a position separated by a certain distance from the position of capture of the first selected image by using the distance between the positions of capture in the determination for selecting the second selected image.

A duplicate or overlapping area between the area of a subject in each selected image may be small when the second selected image is selected only under the above condition. In this case, the number of corresponding feature points between the selected images is small, and the three-dimensional coordinates of a feature point may not be computed. The image selecting unit 12 determines the second selected image by using the number of corresponding feature points in addition to the distance between the positions of capture. Thus, an appropriate second selected image in which the three-dimensional coordinates of a feature point may be accurately computed may probably be selected. As a result, the accuracy of the superimposed position may be improved when a virtual image is displayed in superimposition by using the obtained feature point map 11.

Second Embodiment

Next, a description will be provided for an example of a terminal apparatus that has the function of the three-dimensional coordinate computing apparatus 1 in FIG. 1 and a superimposed image displaying function using the feature point map.

Figure 2:
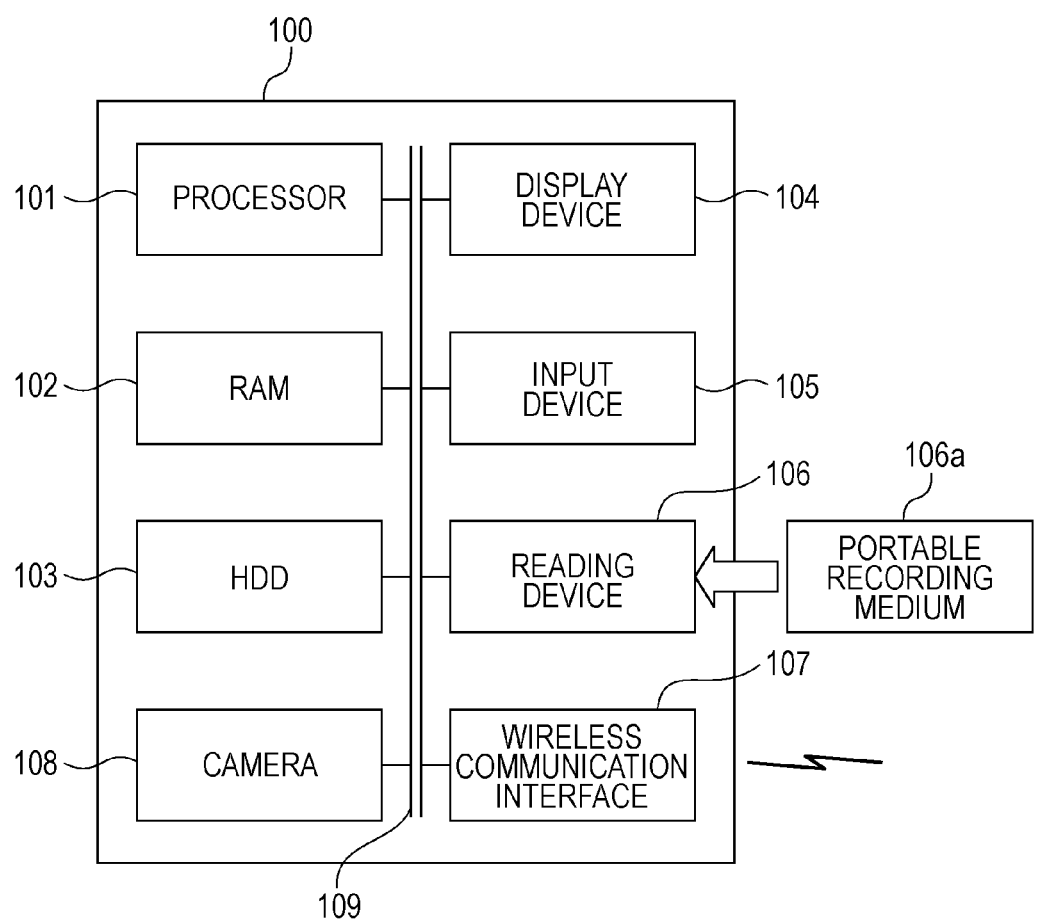
FIG. 2 is a diagram illustrating a hardware configuration example of a terminal apparatus according to a second embodiment.

FIG. 2 is a diagram illustrating a hardware configuration example of the terminal apparatus according to a second embodiment. A terminal apparatus 100 according to the second embodiment is realized as a portable computer as illustrated in FIG. 2.

The entire terminal apparatus 100 illustrated in FIG. 2 is controlled by a processor 101. The processor 101 may be a multiprocessor. The processor 101 is, for example, a central processing unit (CPU), a micro processing unit (MPU), a digital signal processor (DSP), an application specific integrated circuit (ASIC), or a programmable logic device (PLD). The processor 101 may be a combination of two or more elements of a CPU, an MPU, a DSP, an ASIC, and a PLD.

A random access memory (RAM) 102 and multiple peripheral devices are connected to the processor 101 through a bus 109. The RAM 102 is used as a main storage device of the terminal apparatus 100. The RAM 102 temporarily stores at least a part of operating system (OS) programs and application programs executed by the processor 101. The RAM 102 also stores various data that is desired for processes by the processor 101.

The peripheral devices connected to the bus 109 are a hard disk drive (HDD) 103, a display device 104, an input device 105, a reading device 106, a wireless communication interface 107, and a camera 108.

The HDD 103 is used as an auxiliary storage device of the terminal apparatus 100. The HDD 103 stores OS programs, application programs, and various data. Other types of non-volatile storage devices such as a solid state drive (SSD) may also be used as the auxiliary storage device.

The display device 104 displays an image on the screen of the display device 104 according to instructions from the processor 101. The display device 104 is, for example, a liquid crystal display or an organic electroluminescence (EL) display.

The input device 105 transmits a signal corresponding to an input operation by a user to the processor 101. The input device 105 is, for example, a touch panel, a touchpad, a mouse, a trackball, or an operation key that is arranged on a display face of the display device 104.

A portable recording medium 106a is attachable to and detachable from the reading device 106. The reading device 106 reads data recorded on the portable recording medium 106a and transmits the data to the processor 101. The portable recording medium 106a is, for example, an optical disc, a magneto-optical disc, or a semiconductor memory.

The wireless communication interface 107 transmits and receives data to and from another apparatus through wireless communication. The camera 108 digitizes an image signal obtained by a capturing element and transmits the digitized image signal to the processor 101.

Process functions of the terminal apparatus 100 may be realized with the above hardware configuration. The above terminal apparatus 100 has a function of displaying a virtual image in superimposition on a captured image in addition to displaying the image captured by the camera 108 on the display device 104. In the present embodiment, as an example of the virtual image, work support information that is used to support work by a worker is displayed in superimposition on the captured image.

The worker, in this case, carries the terminal apparatus 100 in a workspace where a work target object that is a target of work exists. A marker is attached to a predetermined position on the work target object for each stage of work. A pattern displayed in the marker differs for each stage of work.

The worker, when the camera 108 is installed on the rear face side of the terminal apparatus 100 with respect to the display face of the display device 104, holds up the terminal apparatus 100 to the work target object and captures the area of the work target with the camera 108. Then, the terminal apparatus 100 recognizes the marker from the captured image and specifies a stage of work from the recognition result of the internal pattern of the marker. The terminal apparatus 100 displays the work support information that is associated with the specified stage of work in superimposition at an appropriate position on the captured image.

A method for displaying the virtual image such as the work support information in superimposition at a predetermined position is broadly divided into a "marker-based method" that uses a marker which has a known shape and is arranged at a known position in a real-world space and a "markerless method" that does not use such a marker. The terminal apparatus 100 is capable of displaying an image in superimposition by using at least the markerless method.

A feature point map on which the three-dimensional coordinates of each of multiple feature points existing in the target object and the vicinity of the target object are registered is used in the markerless method. The terminal apparatus 100 estimates the position and the attitude of the camera 108 with respect to the target object by associating multiple feature points specified from the captured image with feature points registered on the feature point map. The terminal apparatus 100 displays the virtual image in superimposition at an appropriate position corresponding to the estimation result on the captured image.

The terminal apparatus 100 further has a function of creating the feature point map based on the captured image from the camera 108. It may be necessary to select two images from captured images so as to create the feature point map.

Figure 3:
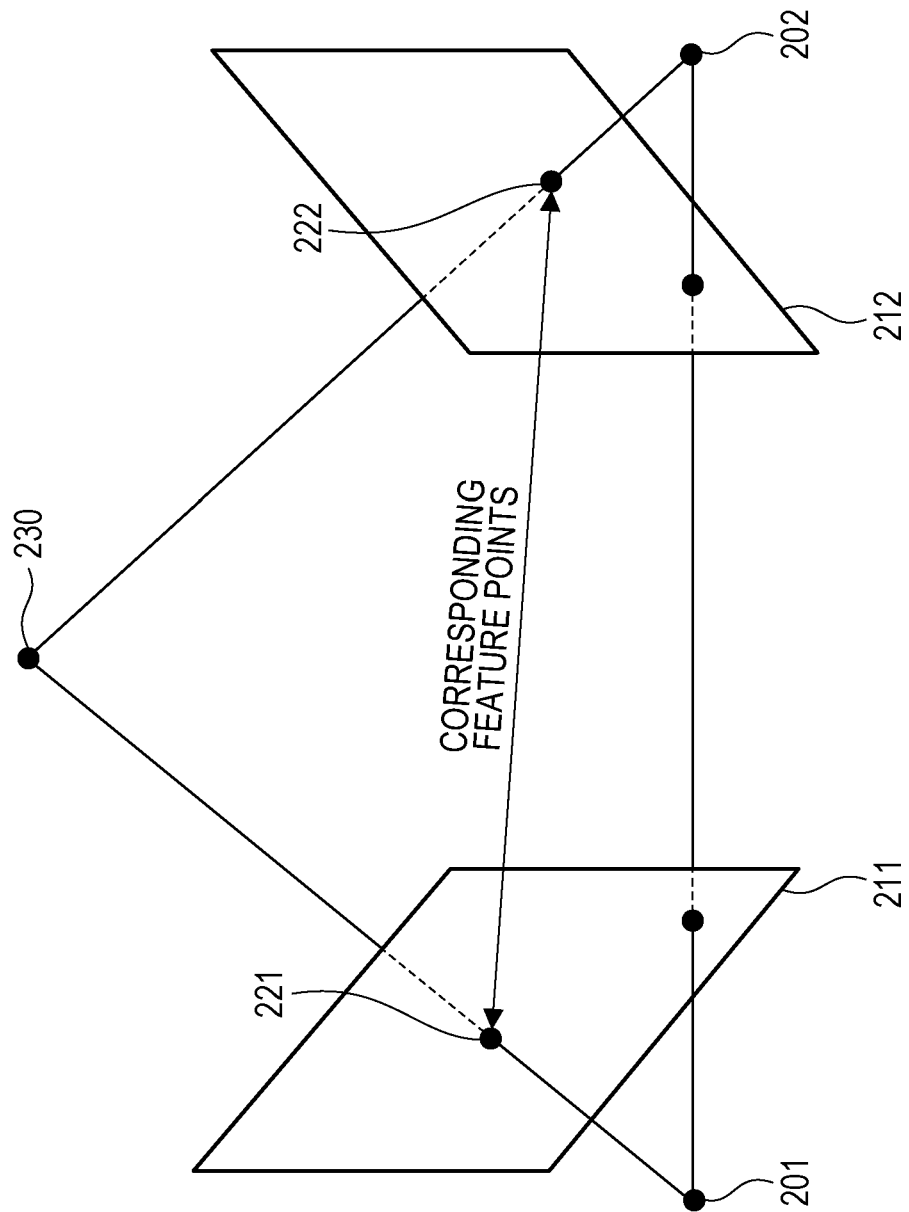
FIG. 3 is a diagram illustrating the three-dimensional coordinates of feature points registered on a feature point map.

FIG. 3 is a diagram illustrating the three-dimensional coordinates of feature points registered on the feature point map. The worker, when creating the feature point map, first captures the target object as a first image 211 at a first camera position 201. Afterward, the worker changes the location and captures the target object as a second image 212 at a second camera position 202.

Multiple corresponding feature points are extracted from the first image 211 and the second image 212. Coordinates of each extracted corresponding feature point in a three-dimensional space are registered on the feature point map. For example, feature points 221 and 222 are respectively extracted from the first image 211 and the second image 212 as corresponding feature points. The feature points 221 and 222 are a feature point 230 on the target object being projected in each of the first image 211 and the second image 212, respectively. The three-dimensional coordinates of the feature point 230 are registered on the feature point map. When more than a predetermined number of corresponding feature points are extracted from each of the first image 211 and the second image 212, the three-dimensional coordinates of each feature point may be reconstructed according to the principle of triangulation by using the coordinates of the feature points in the first image 211 and the second image 212.

The quality of the feature point map changes depending on which position the first camera position 201 and the second camera position 202 are set. For example, when at least one of the first camera position 201 and the second camera position 202 is not set to an appropriate position, a positional relationship between the three-dimensional coordinates of each feature point registered on the feature point map is distorted. When a low-quality feature point map is used, the accuracy of the position of display of the superimposed work support information is decreased.

The worker using the terminal apparatus 100 may not determine where to set the first camera position 201 and the second camera position 202 because the worker may not know the details of the principle of triangulation. When the first camera position 201 and the second camera position 202 are determined by the worker, the quality of the feature point map may be decreased. Therefore, the terminal apparatus 100, as will be described below, has a function for automatically determining the first camera position 201 and the second camera position 202 that are appropriate for creating the feature point map.

Figure 4:
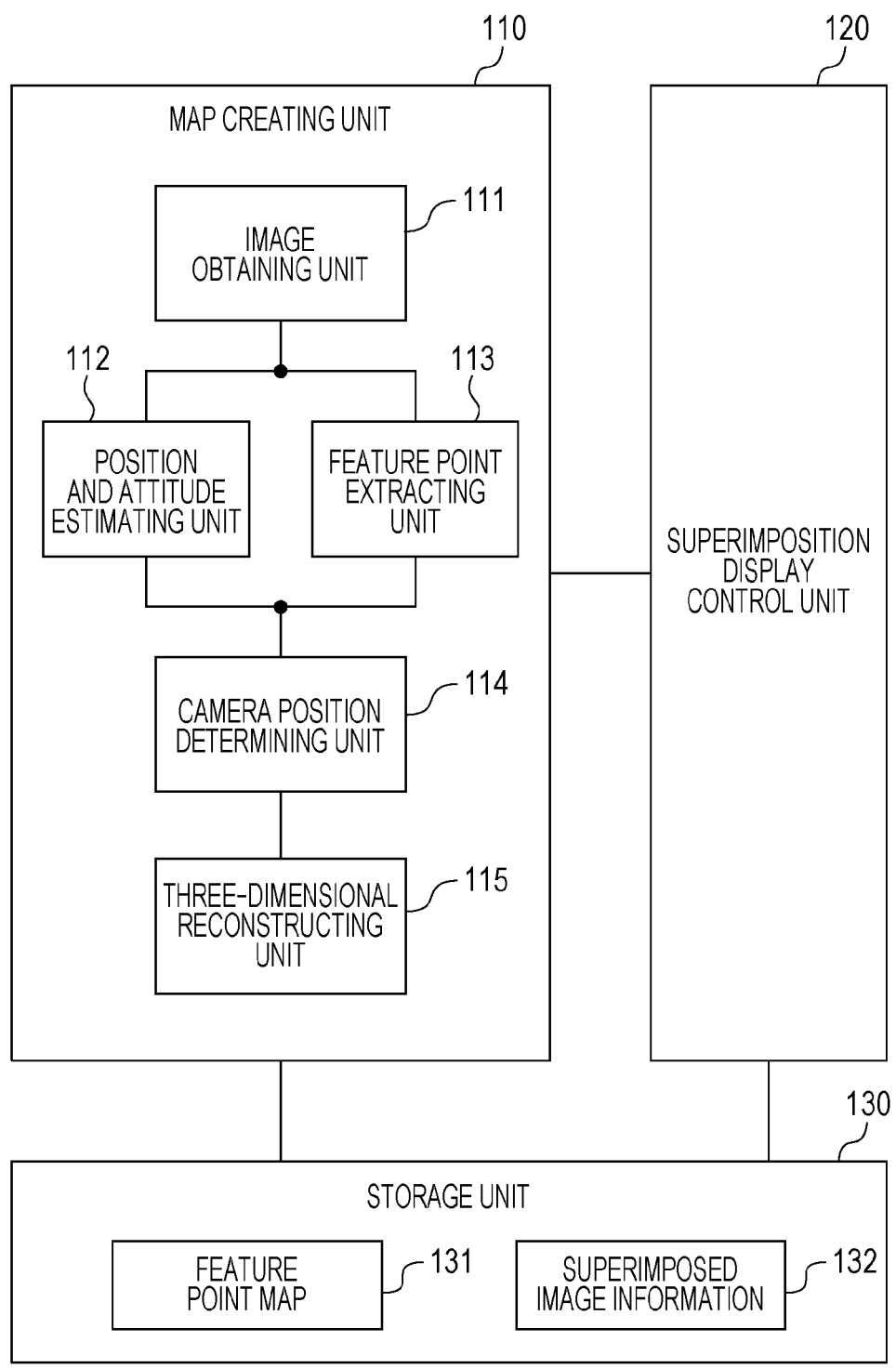
FIG. 4 is a block diagram illustrating a configuration example of process functions that the terminal apparatus has.

FIG. 4 is a block diagram illustrating a configuration example of process functions that the terminal apparatus has. The terminal apparatus 100 is provided with a map creating unit 110, a superimposition display control unit 120, and a storage unit 130. Processes of the map creating unit 110 and the superimposition display control unit 120 are realized by, for example, the processor 101 executing a predetermined program. The storage unit 130 is realized as, for example, the storage area of the RAM 102 or the HDD 103.

The storage unit 130 stores at least a feature point map 131 and a superimposed image information 132. The feature point map 131 is prepared for each stage of work. The three-dimensional coordinates of the work target object corresponding to a stage of work and multiple feature points around the work target object are registered on the feature point map 131. The work support information that is displayed in superimposition on the captured image in each stage of work is registered in the superimposed image information 132.

The superimposition display control unit 120 displays predetermined work support information in superimposition on the captured image from the camera 108 while referring to the feature point map 131. More specifically, as described above, the superimposition display control unit 120 recognizes the marker from the captured image and specifies a stage of work from the recognition result of the internal pattern of the marker. The superimposition display control unit 120 reads the work support information associated with the specified stage of work from the superimposed image information 132 and displays the read work support information in superimposition at an appropriate position on the captured image.

The superimposition display control unit 120 may be capable of displaying the work support information in superimposition by not only the markerless method but also the marker-based method. In this case, the superimposition display control unit 120, for example, may use the marker-based method for displaying in superimposition while the marker is recognizable from the captured image and may switch to the markerless method for displaying in superimposition when the marker is not recognizable.

The map creating unit 110 selects the first one image (first image) and the second one image (second image) used for the creation of the feature point map from the captured images that are obtained from the camera 108 in order. The map creating unit 110 creates the feature point map 131 based on the selected first image and the second image and registers the feature point map 131 on the storage unit 130. The map creating unit 110 uses the recognition result of the marker that is arranged on the work target object when selecting the first image and the second image. The marker may also be used as the marker that is used to identify a stage of work.

The map creating unit 110 is provided with an image obtaining unit 111, a position and attitude estimating unit 112, a feature point extracting unit 113, a camera position determining unit 114, and a three-dimensional reconstructing unit 115. The image obtaining unit 111 obtains the captured image captured by the camera 108 and supplies the captured image to the position and attitude estimating unit 112 and the feature point extracting unit 113.

The position and attitude estimating unit 112 recognizes the marker from the captured image that is input from the image obtaining unit 111 and computes information that indicates the position and the attitude of capture by the camera 108 based on the recognition result of the marker. Hereinafter, the information that indicates the position and the attitude of capture by the camera 108 may be written as "capture position and attitude information".

The feature point extracting unit 113 extracts feature points from the captured image that is input from the image obtaining unit 111. After the first image is selected, the feature point extracting unit 113 tracks multiple feature points extracted from the first image in the captured image that is subsequently input.

The camera position determining unit 114 determines whether the camera 108 is appropriately positioned for obtaining each of the first image and the second image based on the result of processes by the position and attitude estimating unit 112 and the feature point extracting unit 113. Hereinafter, the position of the camera 108 that is appropriate for obtaining the first image may be written as "first camera position", and the position of the camera 108 that is appropriate for obtaining the second image may be written as "second camera position". As will be described later, the determination of the camera 108 being at the first camera position may not be based on the result of processes by the position and attitude estimating unit 112 and the feature point extracting unit 113. For example, the determination may be performed at an arbitrary timing or at the timing when an input operation is performed by a user.

The three-dimensional reconstructing unit 115 creates the feature point map 131 based on the first image obtained when the camera 108 is at the first camera position and the second image obtained when the camera 108 is at the second camera position. The three-dimensional reconstructing unit 115 is also capable of adding information on the newly computed three-dimensional coordinates of a feature point to the previously created feature point map 131 and updating a part of the previous feature point map 131 according to the information on the newly computed three-dimensional coordinates of a feature point.

Next, a description will be provided for processes, among the processes of the map creating unit 110, that are common to later-described first to fifth process examples of the map creating unit 110.

(1) Capture Position and Attitude Information Computing Process

First, an example of a capture position and attitude information computing process performed by the position and attitude estimating unit 112 will be described. The marker having a known shape is arranged in advance on the surface of the target object that is a target of superimposition of the work support information or in the vicinity of the target object. The position and attitude estimating unit 112 recognizes the marker from the captured image that is input from the image obtaining unit 111 and computes the capture position and attitude information based on the recognition result of the marker.

Figure 5:
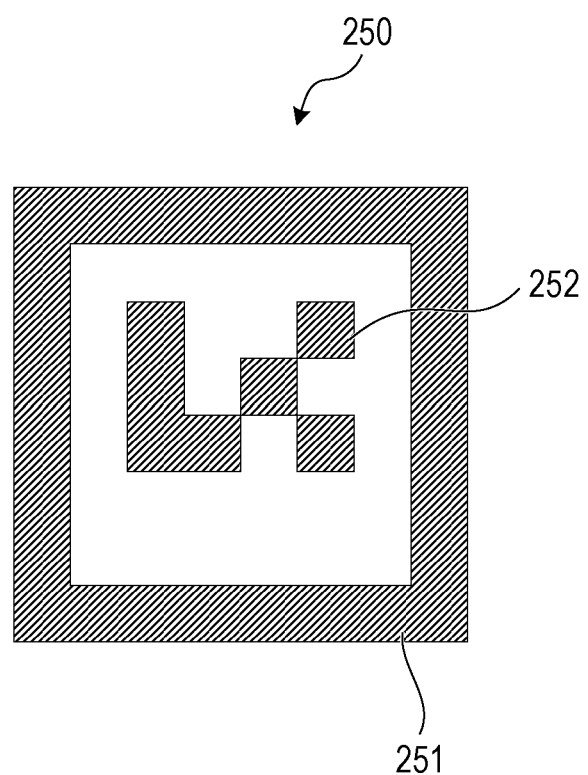
FIG. 5 is a diagram illustrating an example of a marker.

FIG. 5 is a diagram illustrating an example of the marker. A marker 250 has a frame 251 having a rectangular outer frame and includes an internal pattern 252 inside the frame 251. The internal pattern 252 is different for each stage of work. The internal pattern 252 enables the identification of a stage of work.

The position and attitude estimating unit 112, for example, follows the procedure below to detect coordinates of four vertices of the frame 251 of the marker 250, which is included in the captured image, in the captured image. First, the position and attitude estimating unit 112 converts the captured image into a binary-coded image by comparing each pixel of the captured image with a predetermined threshold. Next, the position and attitude estimating unit 112 detects contours of the marker 250 by labeling the binary-coded image. The position and attitude estimating unit 112 then extracts a quadrangle having the four vertices from the detected contours and detects the four vertices in the image. The position and attitude estimating unit 112 recognizes that the detected marker is a desired marker by matching the extracted quadrangular internal pattern against a template pattern that is prepared in advance.

The position and attitude estimating unit 112 next computes the capture position and attitude information that indicates the position and the attitude of capture of the marker 250 based on the coordinates of the four vertices of the marker 250. The capture position and attitude information includes information on the rotational movement component and information on the translational movement component. A rotation matrix R is computed as the former information, and a translation vector T is computed as the latter information.

A marker coordinate system is defined here as a matrix $[X_m\ Y_m\ Z_m\ 1]^T$. "T" at the upper right of the matrix denotes a transpose. The marker coordinate system is a three-dimensional coordinate system in which the center of the marker 250 is the origin, and the face of the marker 250 is an X-Y plane. A camera coordinate system is defined as a matrix $[X_c\ Y_c\ Z_c\ 1]^T$. The camera coordinate system is a three-dimensional coordinate system in which the focal point of the camera 108 is the origin, and the center of the direction of capture is a Z axis. An image coordinate system is defined as a matrix $[x_c\ y_c\ 1]^T$. The image coordinate system is a two-dimensional coordinate system in which the upper left corner of the captured image is the origin.

The rotation matrix R and the translation vector T are defined by the following Equation (1) that represents coordinate transformation from the marker coordinate system to the camera coordinate system. The rotation matrix R is represented by a matrix of three rows and three columns, and the translation vector T is represented by a matrix of three rows and one column.

$$\begin{bmatrix} X_c \\ Y_c \\ Z_c \\ 1 \end{bmatrix} = \begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix} \begin{bmatrix} X_m \\ Y_m \\ Z_m \\ 1 \end{bmatrix} = \begin{bmatrix} R & T \\ 000 & 1 \end{bmatrix} \begin{bmatrix} X_m \\ Y_m \\ Z_m \\ 1 \end{bmatrix} \quad (1)$$

Projective transformation from the camera coordinate system to the image coordinate system is defined as the next Equation (2). A matrix P in Equation (2) is represented as Equation (3).

$$\begin{bmatrix} hx_c \\ hy_c \\ h \\ 1 \end{bmatrix} = P \begin{bmatrix} X_c \\ Y_c \\ Z_c \\ 1 \end{bmatrix} \quad (2)$$

$$P = \begin{bmatrix} P_{11} & P_{12} & P_{13} & 0 \\ 0 & P_{22} & P_{23} & 0 \\ 0 & 0 & 1 & 0 \\ 0 & 0 & 0 & 1 \end{bmatrix} \quad (3)$$

h in Equation (2) is a scalar. The matrix P indicates an internal parameter that is calculated from the focal length and the angle of image obtained from camera calibration. The matrix P, for example, is obtained in advance from the captured image that is obtained by capturing the marker in a state where the marker having a known size is installed at a known distance.

The rotation matrix R, for example, is computed in the following procedure. The position and attitude estimating unit 112 obtains an equation that indicates facing sides $I_1$ and $I_2$ among the four sides of the marker 250 from the coordinates of the four vertices of the marker 250 in the captured image. The position and attitude estimating unit 112 uses the equation that indicates the sides $I_1$ and $I_2$, Equation (2), and Equation (3) to obtain an equation that represents a plane $S_1$ which passes through the side $I_1$ and the focal point of the camera and an equation that represents a plane $S_2$ which passes through the side $I_2$ and the focal point of the camera.

The position and attitude estimating unit 112 computes a directional vector (unit vector) $V_1$ of a plane that includes the sides $I_1$ and $I_2$ by calculating the outer product of normal vectors $n_1$ and $n_2$ of the planes $S_1$ and $S_2$. For other sides $I_3$ and $I_4$ among the four sides of the marker 250, the position and attitude estimating unit 112 also computes a directional vector (unit vector) $V_2$ of a plane that includes sides $I_3$ and $I_4$ through a similar calculation as above. The position and attitude estimating unit 112 further computes a directional vector (unit vector) $V_3$ that is orthogonal with respect to a plane which includes the directional vectors $V_1$ and $V_2$. The above rotation matrix R is obtained as $R=[V_1\ V_2\ V_3]$.

The translation vector T, for example, is computed in the following procedure. Simultaneous equations related to $t_1$, $t_2$, and $t_3$ in the translation vector T $[t_1\ t_2\ t_3]^T$ are obtained by substituting the rotation matrix R obtained by the above procedure and the coordinates of the four vertices of the marker 250 on the captured image in the above Equation (1) and Equation (2). The position and attitude estimating unit 112 computes the translation vector T $[t_1\ t_2\ t_3]^T$ by solving the simultaneous equations by least square approach.

In the present embodiment, the position and attitude estimating unit 112 transforms the rotation matrix R obtained in the above procedure to a three-dimensional rotation vector r. As a transformation method, for example, the next Equation (4) that is called the formula of Rodrigues is used. The direction of the rotation vector r $[r_1\ r_2\ r_3]$ indicates the direction of an axis of rotation, and the magnitude of the rotation vector r $[r_1\ r_2\ r_3]$ indicates the amount of rotation around the axis of rotation.

$$\sin\theta * \begin{bmatrix} 0 & -r_3 & r_2 \\ r_3 & 0 & -r_1 \\ -r_2 & r_1 & 0 \end{bmatrix} = \frac{R - R^T}{2} \quad (4)$$

FIG. 6 is a diagram illustrating an example of a position and attitude information table. A position and attitude information table 133 illustrated in FIG. 6 is recorded on the storage unit 130 by the position and attitude estimating unit 112. In the position and attitude information table 133, records are created for each captured image that is input to the position and attitude estimating unit 112 from the image obtaining unit 111. In each record, a time, the position and attitude information, marker coordinate information, and a selection flag are registered.

The time indicates the time of capture of the captured image. Other information that enables the identification of the captured image may be registered instead of a time. The position and attitude information indicates information on the translation vector T $[t_1\ t_2\ t_3]^T$ and the rotation vector r $[r_1\ r_2\ r_3]$ computed in the above procedure by the position and attitude estimating unit 112. The position and attitude information is registered in the form of $(t_1, t_2, t_3, r_1, r_2, r_3)$. The marker coordinate information indicates the coordinates of the four vertices of the marker 250 on the captured image. The selection flag is flag information that indicates whether the captured image is selected as the first image. "True" is registered in the selection flag when the captured image is selected as the first image, and "False" is registered in the selection flag when the captured image is not selected as the first image.

(2) Feature Point Extracting Process

Next, an example of a feature point extracting process and a tracing process performed by the feature point extracting unit 113 will be described.

The feature point extracting unit 113 extracts multiple feature points from the captured image that is input from the image obtaining unit 111 by using, for example, the feature extraction method of the Features from Accelerated Segment Test (FAST). A feature point extraction method is not limited to this method. For example, methods regarding a corner as a feature point, such as the Harris feature extraction method or the method called "Good Features to Track", may be used. Alternatively, one of local features extraction methods represented by Scale-Invariant Feature Transform (SIFT) and Speeded Up Robust Features (SURF) may also be used.

The feature point extracting unit 113, after the first image is selected, tracks which position in subsequently input captured image each feature point extracted from the first image is moved to. The feature point extracting unit 113, for example, tracks feature points by using the Lucas-Kanade (LK) optical flow. In the LK optical flow, an area similar to a small area in one image is searched from around the same area as the small area in another image. At this time, calculation is performed under a constraining condition that the pixel value of a pixel moving between the images is fixed.

FIG. 7 is a diagram illustrating an example of a feature point information table. A feature point information table 134 illustrated in FIG. 7 is recorded on the storage unit 130 by the feature point extracting unit 113. In the feature point information table 134, records are created for each feature point extracted from the first image. In each record, a feature point number that identifies a feature point, the coordinates of a feature point in the first image, the coordinates of a feature point in the subsequent image, and a tracking flag are registered. The subsequent image is the captured image that is input to the feature point extracting unit 113 from the image obtaining unit 111 after the first image is selected.

The feature point extracting unit 113, when the first image is selected, and feature points are extracted from the first image, creates records corresponding to each extracted feature point in the feature point information table 134 and registers the feature point number and the coordinates in the first image in each record. Afterward, each time the subsequent image is input, and feature points are tracked, the feature point extracting unit 113 updates the coordinates in the subsequent image and the tracking flag in each record. When a feature point corresponding to a feature point in the first image is extracted from the subsequent image, the feature point extracting unit 113 registers the coordinates of the extracted feature point in the cell of the coordinates in the subsequent image in the corresponding record and sets the corresponding tracking flag to "True". Meanwhile, when a feature point corresponding to a feature point in the first image is not extracted from the subsequent image, the feature point extracting unit 113 leaves the cell of the coordinates in the subsequent image empty in the corresponding record and sets the corresponding tracking flag to "False".

(3) Feature Point Map Creating Process

Next, an example of a feature point map creating process performed by the three-dimensional reconstructing unit 115 will be described. The feature point map creating process includes three-stage processes of computing a fundamental matrix F between two cameras, computing a perspective projection matrix $P_{pr}$ between the cameras, and computing and registering the three-dimensional coordinates of each corresponding feature point.

First, the three-dimensional reconstructing unit 115 computes the fundamental matrix F in the following procedure. When a point in a three-dimensional space is projected onto two captured images that are captured from differently positioned cameras, the coordinates of the point on each captured image are assumed as (u, v) and (u', v'). The coordinates (u, v) and the coordinates (u', v') satisfy the following Equation (5). Equation (5) indicates a condition called an epipolar constraint.

$$[u'\ v'\ 1] \begin{bmatrix} f_{11} & f_{12} & f_{13} \\ f_{21} & f_{22} & f_{23} \\ f_{31} & f_{32} & f_{33} \end{bmatrix} \begin{bmatrix} u \\ v \\ 1 \end{bmatrix} = 0 \quad (5)$$

In Equation (5), the matrix of three rows and three columns including nine components of $f_{11}$ to $f_{13}$, $f_{21}$ to $f_{23}$, and $f_{31}$ to $f_{33}$ is the fundamental matrix F. Although the number of components of the fundamental matrix F is nine, the actual number of unknowns is eight because there is a certain number of times of uncertainties in the fundamental matrix F. Thus, when at least eight corresponding feature points are obtained between the images, the fundamental matrix F may be determined. The three-dimensional reconstructing unit 115 computes the fundamental matrix F from the coordinates of eight corresponding feature points extracted from the first image and the subsequent image in each image by using, for example, a method called the eight-point algorithm.

Next, the three-dimensional reconstructing unit 115 computes the perspective projection matrix $P_{pr}$ in the following procedure. A matrix A here is an internal parameter of a camera. The internal parameter may be obtained in advance. The three-dimensional reconstructing unit 115 uses the computed fundamental matrix F and the matrix A to compute an elementary matrix E between the cameras by the following Equation (6).

$$E = AF^T A \quad (6)$$

Next, the three-dimensional reconstructing unit 115 performs singular value decomposition on the computed elementary matrix E by using the following Equation (7).

$$E = U\Sigma V^T \quad (7)$$

The three-dimensional reconstructing unit 115 uses an obtained matrix U to compute a relative rotation matrix $R_r$ from the following Equation (8-1) and Equation (8-2). The relative rotation matrix $R_r$ is obtained as two types of $R_{r1}$ and $R_{r2}$.

$$R_{r1} = U \begin{bmatrix} 0 & -1 & 0 \\ 1 & 0 & 0 \\ 0 & 0 & -1 \end{bmatrix} V^T \quad (8\text{-}1)$$

$$R_{r2} = U \begin{bmatrix} 0 & 1 & 0 \\ -1 & 0 & 0 \\ 0 & 0 & -1 \end{bmatrix} V^T \quad (8\text{-}2)$$

Next, given that t is the third row component of the matrix U, the three-dimensional reconstructing unit 115 computes four types of the perspective projection matrix $P_{pr}$ by the following Equation (9-1) to Equation (9-4). A matrix ($R_x$|t) means a matrix of three rows and four columns formed by combining a matrix $R_x$ of three rows and three columns and the matrix t.

$$P_{pr1} = A(R_{r1}|t) \quad (9\text{-}1)$$

$$P_{pr2} = A(R_{r1}|-t) \quad (9\text{-}2)$$

$$P_{pr3} = A(R_{r2}|t) \quad (9\text{-}3)$$

$$P_{pr4} = A(R_{r2}|-t) \quad (9\text{-}4)$$

Next, the three-dimensional reconstructing unit 115 computes the three-dimensional coordinates of a corresponding feature point in the following procedure. Given that the components of the perspective projection matrix $P_{pr}$ are represented as $p_{11}$ to $p_{14}$, $p_{21}$ to $p_{24}$, and $p_{31}$ to $p_{34}$, the three-dimensional reconstructing unit 115 obtains the least square solution for simultaneous equations related to three-dimensional coordinates (X, Y, Z) which are represented by the following Equation (10) for each of the perspective projection matrices $P_{pr1}$ to $P_{pr4}$.

$$\begin{bmatrix} -1 & 0 & u \\ 0 & -1 & v \\ p_{31}u' - p_{11} & p_{32}u' - p_{12} & p_{33}u' - p_{13} \\ p_{31}v' - p_{21} & p_{32}v' - p_{22} & p_{33}v' - p_{23} \end{bmatrix} \begin{bmatrix} X \\ Y \\ Z \end{bmatrix} = \begin{bmatrix} 0 \\ 0 \\ p_{14} - p_{34}u' \\ p_{24} - p_{34}v' \end{bmatrix} \quad (10)$$

The three-dimensional reconstructing unit 115 calculates one optimum solution from four types of solutions obtained above by using a condition that reconstructed points exist together in front of a camera. The three-dimensional reconstructing unit 115 computes the three-dimensional coordinates of each corresponding feature point by repeating the calculation for all corresponding feature points. The three-dimensional coordinates obtained in the procedure are coordinates in a three-dimensional space (a space in the camera coordinate system) with the position of capture of the first image as the reference. The position of capture of the first image is the origin of the coordinates.

The three-dimensional reconstructing unit 115 computes the three-dimensional coordinates of each corresponding feature point between the first image and the second image in the above procedure and registers the three-dimensional coordinates on the feature point map 131.

Next, process examples of the map creating unit 110 will be described.

First Process Example

Figure 8:
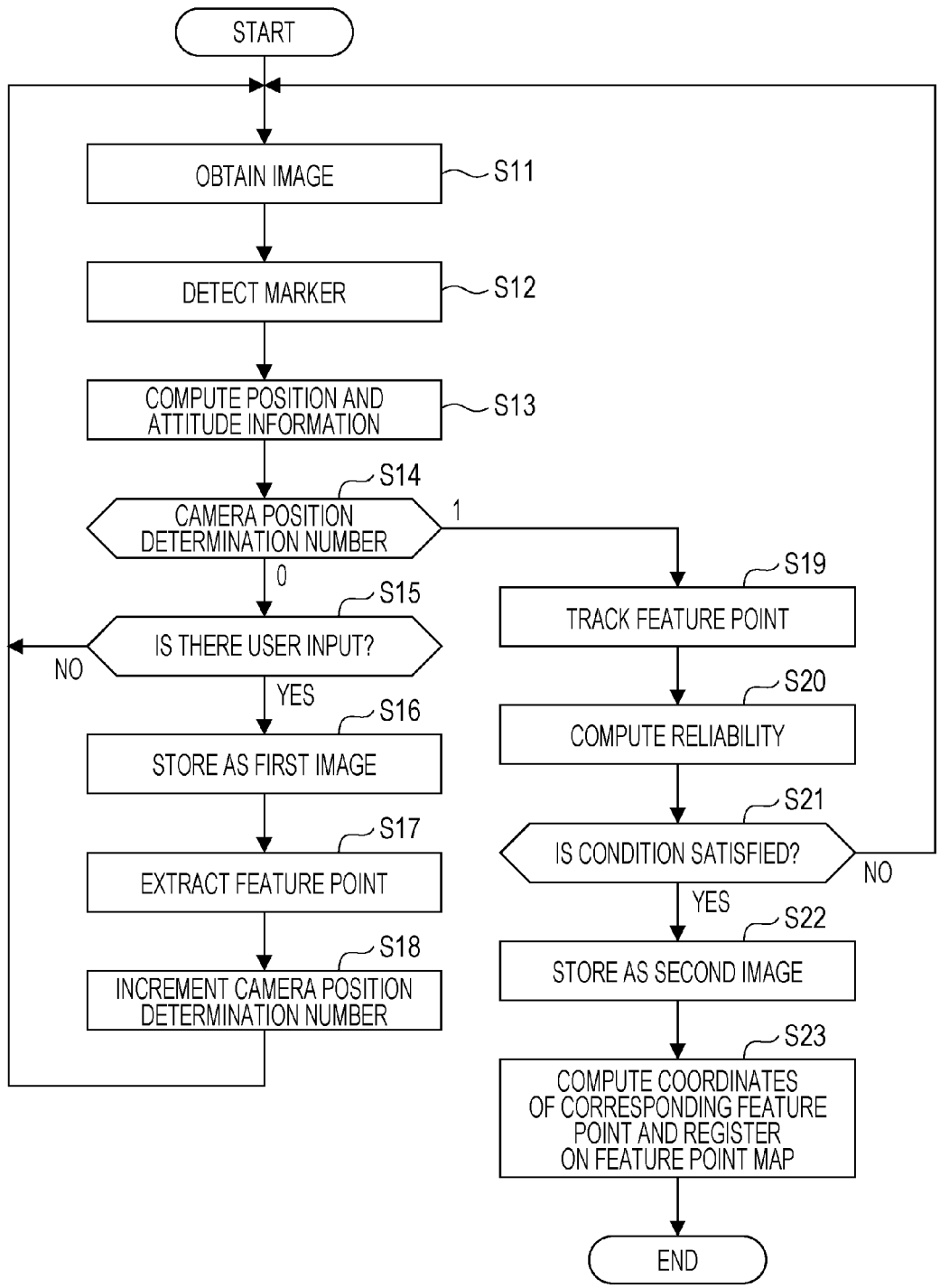
FIG. 8 is a flowchart illustrating a procedure of a first process example.

FIG. 8 is a flowchart illustrating a procedure of a first process example. In the process of FIG. 8, the process from steps S11 to S14 to steps S15 to S18 corresponds to a process related to the first image, and the subsequently performed process of steps S11 to S14 and steps S19 to S22 corresponds to a process of selecting the second image.

In Step S11, the image obtaining unit 111 obtains the captured image from the camera 108 and supplies the captured image to the position and attitude estimating unit 112 and the feature point extracting unit 113. In Step S12, the position and attitude estimating unit 112 detects data indicative of the marker 250 in the captured image that is input from the image obtaining unit 111 and computes the coordinates of the four vertices of the marker in the captured image. The position and attitude estimating unit 112 creates a record that corresponds to the captured image in the position and attitude information table 133, registers the current time in the time field, and registers the computed coordinates of the four vertices in the marker coordinate information field.

The process returns to step S11 when, although not illustrated, the marker is not detected in the captured image in step S12, and the process is performed by using the next captured image. In Step S13, the position and attitude estimating unit 112 computes the position and attitude information that indicates the position and the attitude of capture of the captured image based on the coordinates of the four vertices computed in step S12. A method for computing the position and attitude information is as described in the above section (1). The position and attitude estimating unit 112 registers the computed position and attitude information in the position and attitude information field in the record that is created in the position and attitude information table 133 in step S12.

In Step S14, the camera position determining unit 114 determines whether a camera position determination number is "0" or "1". The camera position determination number is a variable that indicates the number of determinations of the position of capture of the image used in the creation of the feature point map 131. The camera position determination number is stored on the storage unit 130. The camera position determination number is reset to "0" at the start of the process which is illustrated in FIG. 8.

Neither the first image nor the second image is selected when the camera position determination number is "0". In this case, the process of step S15 is performed. Meanwhile, when the camera position determination number is "1", only the first image is determined. In this case, the process step S19 is performed.

In Step S15, the camera position determining unit 114 determines whether an input operation for selecting the first image is performed by a user. When the input operation is performed, the process of step S16 is performed. Meanwhile, when the input operation is not performed, the camera position determining unit 114 registers "False" in the selection flag field of the record that is registered in the position and attitude information table 133 in step S12. Then, the process of step S11 is performed again.

In Step S16, the camera position determining unit 114 stores the captured image that the image obtaining unit 111 obtains in step S11 as the first image on the storage unit 130. In addition, the camera position determining unit 114 registers "True" in the selection flag field of the record that is registered in the position and attitude information table 133 in step S12.

In Step S17, the feature point extracting unit 113 extracts multiple feature points from the stored first image. A method for extracting feature points is as described in the above section (2). The feature point extracting unit 113 creates records that correspond to each extracted feature point in the feature point information table 134 and assigns feature point numbers to each record. The feature point extracting unit 113 registers the coordinates of a corresponding feature point in the field of the coordinates in the first image in each record.

In Step S18, the camera position determining unit 114 increments the camera position determination number by "1". Afterward, the process of step S11 is performed again. In the process so far, the first image is selected when the camera position determination number is "0" in step S14, and the user input is determined to be performed in step S15. In addition, the position and attitude information corresponding to the first image is registered in the first record of the position and attitude information table 133, and the coordinates of a feature point in the first image are registered in the feature point information table 134.

In the process of FIG. 8, the captured image that is obtained when the input operation for selecting the first image is performed by a user is selected as the first image. However, the next method that does not demand an input operation may also be used as a method for selecting the first image. For example, when information indicative of a predetermined marker is detected in a captured image, the camera position determining unit 114 may select the captured image as the first image.

Next, the following process is performed when the camera position determination number is "1" in step S14. When the camera position determination number is "1" in step S14, the position and attitude information is registered for multiple captured images in the position and attitude information table 133.

In Step S19, the feature point extracting unit 113 tracks each feature point registered in the feature point information table 134 in the captured image that is input from the image obtaining unit 111. A method for tracking a feature point is as described in the above section (2).

The feature point extracting unit 113, when a feature point corresponding to the feature point registered in the feature point information table 134 is extracted from the captured image, registers the coordinates of the feature point on the captured image in the field of the coordinates in the subsequent image of the corresponding record in the feature point information table 134. In addition, the feature point extracting unit 113 registers "True" in the tracking flag field of the same record.

The feature point extracting unit 113, meanwhile, when a feature point corresponding to the feature point registered in the feature point information table 134 is not extracted from the captured image, leaves the field of the coordinates in the subsequent image of the corresponding record empty in the feature point information table 134 (or registers "NULL"). In addition, the feature point extracting unit 113 registers "False" in the tracking flag field of the same record.

In Step S20, the camera position determining unit 114 computes a reliability s that is used to determine whether the position of capture of the input captured image is appropriate as the second camera position described above. As will be described later, the reliability s is computed based on a movement sufficiency degree that indicates that the position of capture is sufficiently moved from the time of capture of the first image and a tracking success rate that indicates that a sufficient number of feature points are tracked.

In Step S21, the camera position determining unit 114 determines whether the computed reliability s satisfies a predetermined condition. When the condition is satisfied, the process of step S22 is performed. Meanwhile, when the condition is not satisfied, the camera position determining unit 114 deletes all information registered in each field of the coordinates in the subsequent image and the tracking flag in the feature point information table 134. Afterward, the process of step S11 is performed.

In Step S22, the camera position determining unit 114 stores the input captured image as the second image on the storage unit 130. In Step S23, the three-dimensional reconstructing unit 115 selects at least eight records in which the tracking flag is "True" in the feature point information table 134. The three-dimensional reconstructing unit 115 computes the three-dimensional coordinates of each feature point from the coordinates, in the first image and in the second image, of feature points corresponding to each selected record. A method for computing the three-dimensional coordinates of a feature point is as described in the above section (3).

The three-dimensional reconstructing unit 115 registers the computed three-dimensional coordinates of each feature point on the feature point map 131. Accordingly, the feature point map 131 is created. The details of the second camera position determining process in steps S20 and S21 will be described here.

Figure 9:
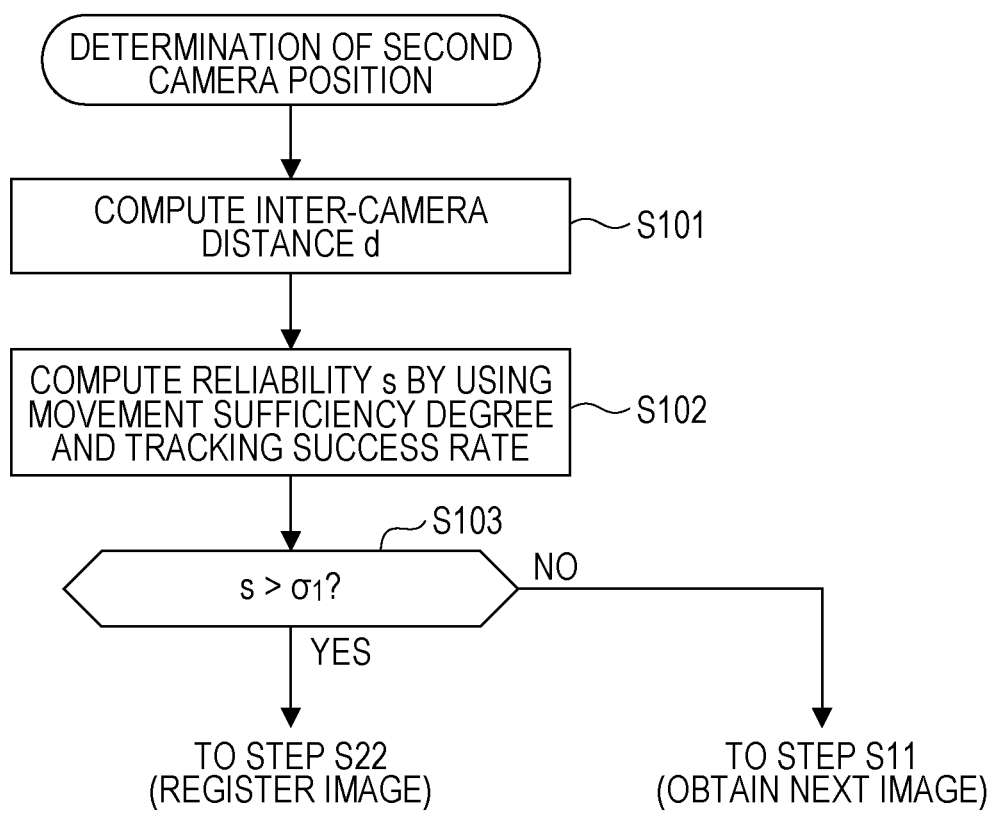
FIG. 9 is a flowchart illustrating a procedure of a second camera position determining process in the first process example.

FIG. 9 is a flowchart illustrating a procedure of the second camera position determining process in the first process example. In FIG. 9, the process of steps S101 and S102 corresponds to the process of step S20 in FIG. 8, and the process of step S103 corresponds to the process of step S21 in FIG. 8.

In Step S101, the camera position determining unit 114 computes an inter-camera distance d by the following Equation (11).

$$d = |t_s - t_f| = \sqrt{(t_{s1} - t_{f1})^2 + (t_{s2} - t_{f2})^2 + (t_{s3} - t_{f3})^2} \qquad (11)$$

In Equation (11), $t_f=(t_{f1}, t_{f2}, t_{f3})$ is a translational movement component in the position and attitude information obtained from the first image. $(t_{f1}, t_{f2}, t_{f3})$ corresponds to $(t_1, t_2, t_3)$ in the position and attitude information that is registered in the record in which the selection flag is "True" among the records in the position and attitude information table 133. $t_s=(t_{s1}, t_{s2}, t_{s3})$ is a translational movement component of the position and attitude information obtained from the input captured image. $(t_{s1}, t_{s2}, t_{s3})$ corresponds to $(t_1, t_2, t_3)$ of the position and attitude information that is registered in the last record of the position and attitude information table 133.

Equation (11) obtains the Euclidean distance between the translation vector computed from the first image and the translation vector computed from the input captured image. In other words, the distance between the position of capture of each image in the three-dimensional space is obtained by Equation (11).

In Step S102, the camera position determining unit 114 computes the reliability s by the following Equation (12).

$$s = \min\left(\frac{d}{D}, 1\right) * \left(\frac{N_c}{N_i}\right) \quad (12)$$

In Equation (12), min(x, y) is an operation that outputs the smaller value between x and y. D is a reference inter-camera distance and is set in advance to an ideal inter-camera distance. $N_i$ is the number of feature points extracted from the first image. $N_i$ corresponds to the number of records in the feature point information table 134. $N_c$ is the number of corresponding feature points that are extracted from the input captured image and correspond to the feature points in the first image. $N_c$ corresponds to the number of records in which the tracking flag is "True" in the feature point information table 134. That is, $N_c$ is the number of corresponding feature points that are successfully tracked in the input captured image.

The first term on the right-hand side of Equation (12) indicates the movement sufficiency degree, and the second term indicates the tracking success rate. In Step S103, the camera position determining unit 114 determines whether the reliability s is greater than a predetermined threshold $\sigma_1$. When the reliability s is greater than the threshold $\sigma_1$, the position of capture of the input captured image is determined to be appropriate as the second camera position, and the process of step S22 in FIG. 8 is performed. Meanwhile, when the reliability s is less than the threshold $\sigma_1$, the position of capture of the input captured image is determined to be inappropriate as the second camera position. In this case, the camera position determining unit 114 deletes all information registered in each field of the coordinates in the subsequent image and the tracking flag in the feature point information table 134. Afterward, the process of step S11 is performed.

The value of the movement sufficiency degree in the above Equation (12) indicates the proportion of the current inter-camera distance to the ideal inter-camera distance. When $N_c=N_i$ is assumed, in the determination of step S103, the current position of capture is determined to be appropriate as the second camera position when the current inter-camera distance is greater than or equal to a predetermined distance that is based on the reference inter-camera distance D.

Generally, the accuracy of computing the three-dimensional coordinates of a feature point is decreased when the positions of capture of the two images used in the creation of the feature point map 131 are excessively close. Since the above determination based on the movement sufficiency degree is performed, an image that is captured at the position of capture which is separated certainly by a predetermined distance or more from the position of capture of the first image is selected as the second image. Accordingly, the accuracy of computing the three-dimensional coordinates of a feature point may be increased, and the quality of the created feature point map 131 may be improved. 100 mm may be applied as an example of the value of the reference inter-camera distance D, and 0.9 may be applied as an example of the value of the threshold $\sigma_1$.

An example of a camera moving operation that may degrade the accuracy of computing the three-dimensional coordinates of a feature point is an operation called panning. Panning is an operation in which many rotational components are included in the camera moving operation. When panning is performed in a period from the selection of the first image until the selection of the second image, the three-dimensional position of the camera may be less changed even though the position of the subject in the captured image is greatly changed. In this case, the accuracy of computing the three-dimensional coordinates of a feature point is decreased. When a user who does not know the details of how to select an image selects the second image by an input operation, the user may select the second image regardless of the fact that panning is performed when the movement of the subject in the captured image is observed. The possibility of such a case occurring may be reduced by the above selection of the second image based on the movement sufficiency degree.

Meanwhile, an example of the camera moving operation that is appropriate for the creation of the feature point map 131 is an operation called "pivoting" in which the position of the camera pivots around the target object. When pivoting is performed, the displacement of the three-dimensional coordinates of the camera is comparatively great. When the second image is selected based on the movement sufficiency degree as described above, the second image is easily selected when pivoting is performed.

The value of the tracking success rate in the above Equation (12) indicates the proportion of the number of corresponding feature points that are tracked in the input captured image among the feature points extracted from the first image. The three-dimensional coordinates of each corresponding feature point may be accurately computed as the number of corresponding feature points between the selected two images is great. Thus, by determining that the reliability as the second image is high as the tracking success rate is high, the accuracy of computing the three-dimensional coordinates of the corresponding feature point may be increased.

The effect of increasing the accuracy of computing the three-dimensional coordinates of a feature point is achieved even when the tracking success rate is not used and only the movement sufficiency degree is used (that is, when Equation (12) includes only the first term on the right-hand side). However, when only the movement sufficiency degree is used, for example, an overlapping area of the subject area in the first image and the subject area in the subsequent captured image is small, and a case where corresponding feature points are only obtained from a very narrow subject area may occur. Regarding this matter, by using not only the movement sufficiency degree but also the tracking success rate as in Equation (12), the possibility of such a case occurring may be reduced.

Instead of the determination using the tracking success rate, it is also possible to use a method of determining whether the number of corresponding feature points that are tracked in the input captured image among the feature points extracted from the first image is greater than a predetermined threshold. In this case, a value greater than or equal to eight is used as the threshold. However, using the tracking success rate allows the second image to be selected with a large overlapping area of the subject area in the first image and the subject area in the second image as described above.

Second Process Example

A fixed value is used as the reference inter-camera distance D in the above first process example. Regarding this matter, in a second process example, the reference inter-camera distance D may be dynamically changed depending on the distance between the marker 250 and the position of capture. Hereinafter, only a part of the second process example that is different from the first process example will be described.

Figure 10:
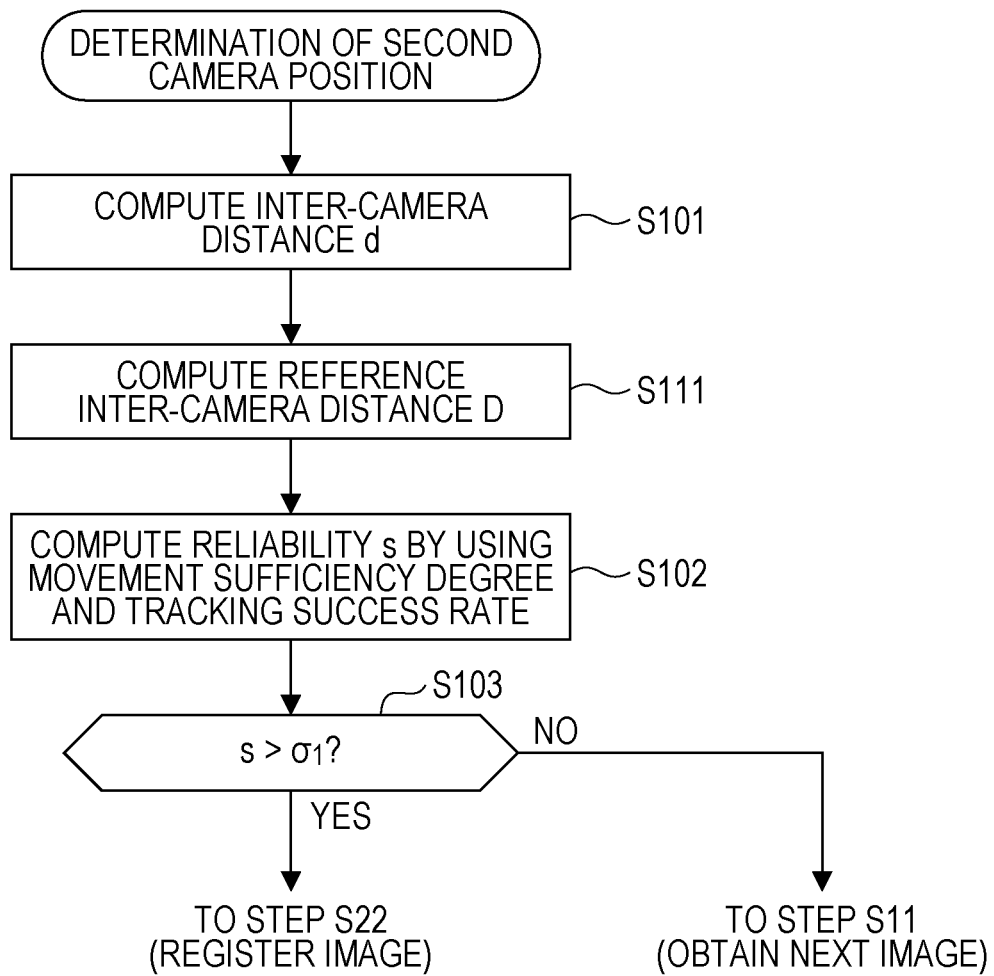
FIG. 10 is a flowchart illustrating a procedure of a second camera position determining process in a second process example.

FIG. 10 is a flowchart illustrating a procedure of the second camera position determining process in the second process example. The process illustrated in FIG. 10 is configured by adding step S111 between step S101 and step S102 in the process illustrated in FIG. 9. Step S111 may be added before step S101.

In Step S111, the camera position determining unit 114 computes the reference inter-camera distance D by the following Equation (13).

$$D = \min\left(\frac{Z * dr}{f}, D_{ini}\right) \quad (13)$$

In Equation (13), Z is the camera-marker distance, as a distance between the camera and the marker, and is computed as the distance of the translation vector T that is obtained from the input captured image. dr is the optimum value of the amount of movement of a pixel and is set in advance. f is the focal length of the camera and is set in advance. $D_{ini}$ is the initial value of the reference inter-camera distance. For example, the same value as the set value of the reference inter-camera distance D in the first process example is set as $D_{ini}$.

In step S102 of FIG. 10, the reliability s is calculated by using the reference inter-camera distance D that is computed in step S111. When the reference inter-camera distance D is a fixed value as in the first process example, an overlapping area that is captured between the first image and the current image is small when the distance between the camera and the target object is small. As a result, the number of corresponding feature points may be decreased. Regarding this matter, in the second process example, the reference inter-camera distance D becomes short when the camera-marker distance Z becomes short to a certain extent. The second image is selected even when the amount of movement of the position of capture is smaller than that in the first process example. As a result, the second image is selected before the distance between the camera and the target object becomes excessively small, and the reduction of the number of corresponding feature points may be suppressed.

Third Process Example

A phenomenon such that the second image is not selected even after the passage of time may occur when the above-described panning is performed after the first image has been selected because the inter-camera distance d has a value close to zero. Therefore, a third process example is configured to be capable of detecting the movement of the camera that is similar to panning, notifying a user of the detection, and prompting the user to move the position of the camera to a greater extent. Hereinafter, only a part of the third process example that is different from the first process example will be described.

Figure 11:
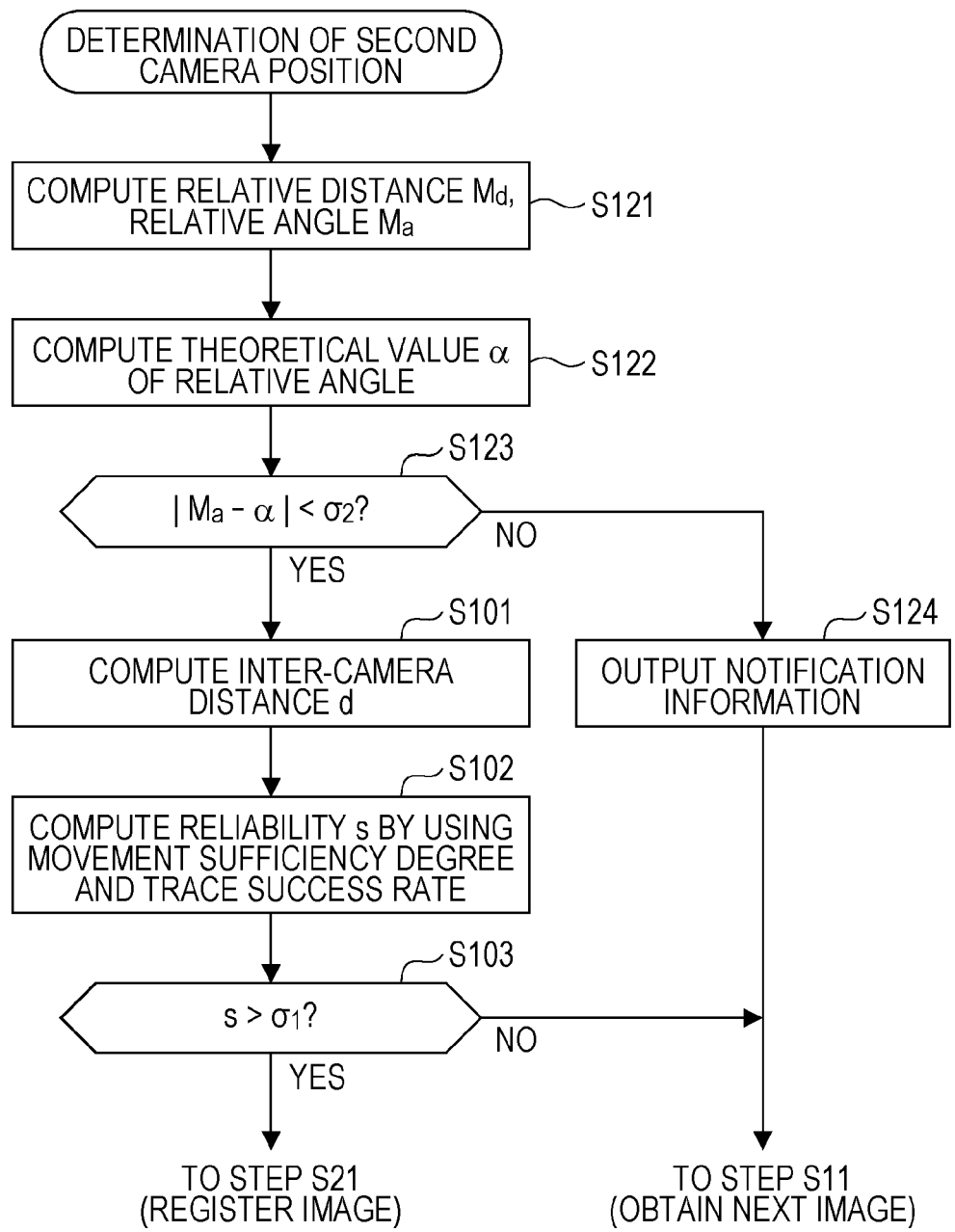
FIG. 11 is a flowchart illustrating a procedure of a second camera position determining process in a third process example.

FIG. 11 is a flowchart illustrating a procedure of the second camera position determining process in the third process example. The process illustrated in FIG. 11 is configured by adding steps S121 to S124 to the process illustrated FIG. 9. Steps S121 to S124 may also be added to the process illustrated in FIG. 10.

In Step S121, the camera position determining unit 114 computes an inter-marker relative distance $M_d$ and an inter-marker relative angle $M_a$.

In Step S122, the camera position determining unit 114 uses the computed relative angle $M_a$ to compute a theoretical value α of the relative angle.

In Step S123, the camera position determining unit 114 determines whether the difference between the inter-marker relative angle $M_a$ and the theoretical value α is less than a threshold $σ_2$. When the difference is less than the threshold $σ_2$, it is determined that panning is not performed, and the process of step S101 is performed. Meanwhile, when the difference is greater than or equal to the threshold $σ_2$, it is determined that a movement similar to panning is performed, and the process of step S124 is performed.

In Step S124, the camera position determining unit 114 outputs notification information for the user. The notification information includes, for example, the fact that the manner of moving the camera is not appropriate and a content that prompts the user to move the position of the camera. The notification information, for example, is displayed on the display device 104 or is output as auditory information. Afterward, the process returns to the process of step S11 in FIG. 8.

Figure 12:
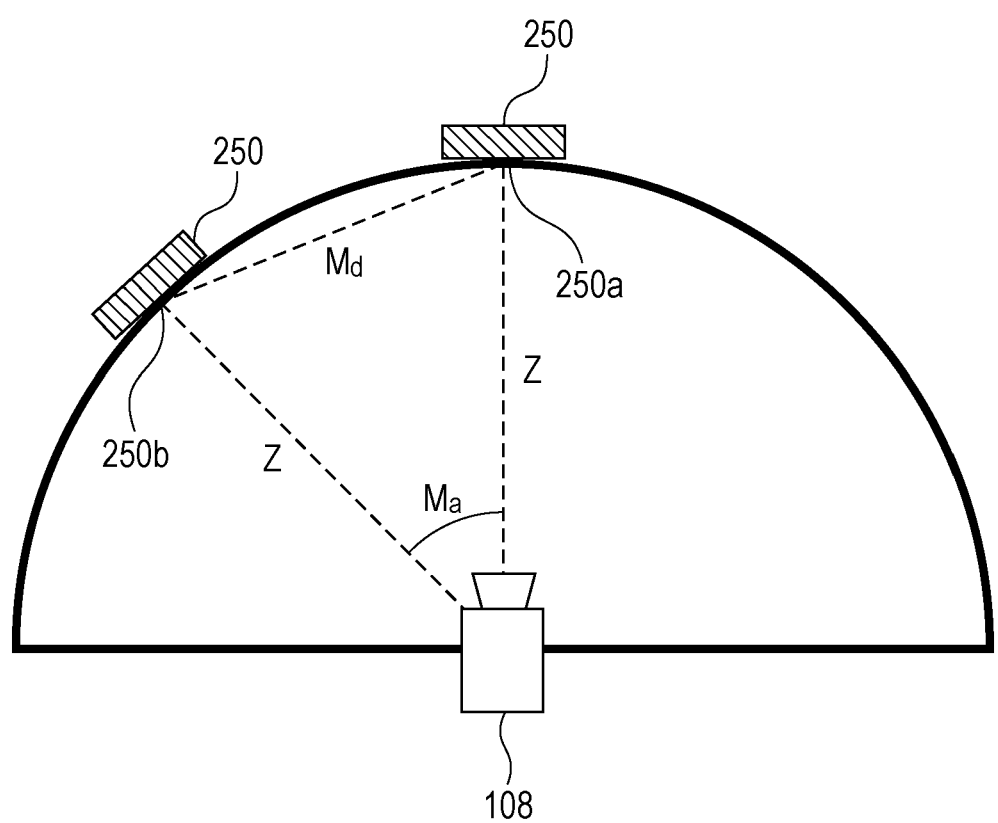
FIG. 12 is a diagram illustrating a positional relationship between a marker and a camera when panning is performed.

Hereinafter, the details of the calculation method in the process illustrated in FIG. 11 will be described. FIG. 12 is a diagram illustrating a positional relationship between the marker and the camera when panning is performed. In FIG. 12, it is assumed that a complete panning operation in which the distance between the camera 108 and the marker 205 is kept, and the camera 108 is rotated around the direction of capture is performed.

Each of positions 250a and 250b indicates the relative position of the marker 250 with respect to the camera 108 as the center at the time of capture of the first image and the current image. That is, when the direction of capture of the camera 108 is rotated in a right-handed direction in FIG. 12 after the first image has been captured, the relative position of the marker 250 with respect to the camera 108 is changed from the position 250a to the position 250b. The inter-marker relative distance $M_d$ indicates the distance between the position 250a and the position 250b in the camera coordinate system. The inter-marker relative angle $M_a$ indicates the angle between a line from the position of the camera 108 to the position 250a and a line from the position of the camera 108 to the position 250b.

The camera position determining unit 114 computes the relative distance $M_d$ and the relative angle $M_a$ by using the position and attitude information computed from the first image and the position and attitude information computed from the input captured image. The position and attitude information ($t_1$, $t_2$, $t_3$, $r_1$, $r_2$, $r_3$) computed by the position and attitude estimating unit 112 indicates a position and an attitude in the marker coordinate system. Thus, it may be appropriate to transform the computed position and attitude information ($t_1$, $t_2$, $t_3$, $r_1$, $r_2$, $r_3$) to a value in the camera coordinate system so as to compute the relative distance $M_d$ and the relative angle $M_a$ as in FIG. 12.

The following Equation (14) is an equation that is used to transform the rotation vector r in the marker coordinate system to a rotation matrix R'. Transformation by Equation (14) is called "Rodrigues transformation". Equation (15) is an equation that is used to transform the position and attitude information ($t_1$, $t_2$, $t_3$, $r_1$, $r_2$, $r_3$) in the marker coordinate system to an attitude matrix $P_{ps}$ of four rows and four columns.

$$R' = \cos(\theta)*I + (1-\cos(\theta))*rr^T + \sin(\theta)*\begin{bmatrix} 0 & -r_3 & r_2 \\ r_3 & 0 & -r_1 \\ -r_2 & r_1 & 0 \end{bmatrix} \quad (14)$$

$$P_{ps} = \begin{pmatrix} R' & t \\ 0 & 1 \end{pmatrix} \quad (15)$$

The position and attitude information of the marker 250 with the position of the camera 108 as the reference is obtained by performing Rodrigues transformation on the inverse of the attitude matrix $P_{ps}$. The position and attitude information of the marker 250 with the position of capture of the first image as the reference is given ($r_{mf}$, $t_{mf}$), and the position and attitude information of the marker 250 with the position of capture of the input capture image (current image) as the reference is given ($r_{ms}$, $t_{ms}$). The camera position determining unit 114 computes the relative distance $M_d$ and the relative angle $M_a$ by the following Equation (16-1) and Equation (16-2) based on the position and attitude information obtained from the first image and the position and attitude information obtained from the input captured image.

$$M_d = |t_{ms} - t_{mf}| \quad (16\text{-}1)$$

$$M_d = |r_{ms} - r_{mf}| \quad (16\text{-}2)$$

The camera position determining unit 114 also computes the theoretical value α of the relative angle when the position of the camera 108 is not changed at all, and only the direction of capture of the camera 108 is rotated by the following Equation (17).

$$\alpha = \cos^{-1}\left(1 - \frac{M_d^2}{2Z^2}\right) \quad (17)$$

In the above step S123, the camera position determining unit 114, when the difference between the inter-marker relative angle $M_a$ and the theoretical value α is less than the threshold $\sigma_2$, determines that panning is not performed and continues the process of selecting the second image. Meanwhile, when the difference is greater than or equal to the threshold $\sigma_2$, the camera position determining unit 114 determines that a movement similar to panning is performed and prompts the user to move the position of capture. Such a process may shorten the time taken until the second image is selected.

Fourth Process Example

A fourth process example is configured to be capable of automatically selecting not only the second image but also the first image without an input operation by the user. Hereinafter, only a part of the fourth process example that is different from the first to the third process examples will be described.

Figure 13:
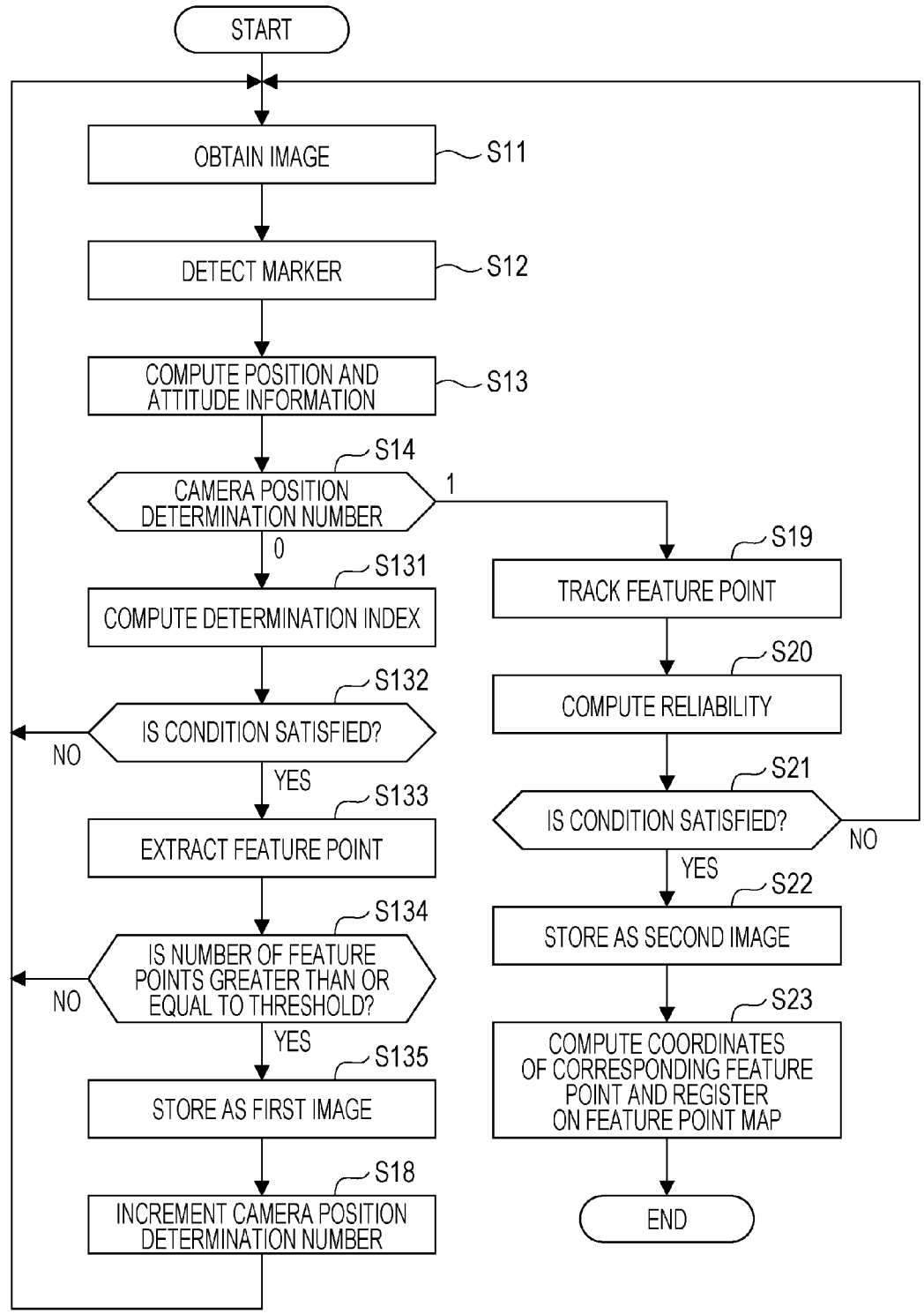
FIG. 13 is a flowchart illustrating a procedure of a fourth process example.

FIG. 13 is a flowchart illustrating a procedure of the fourth process example. The process illustrated in FIG. 13 is configured by replacing steps S15 to S17 in FIG. 8 with steps S131 to S135.

In Step S131, the camera position determining unit 114 computes a determination index that is used to determine whether an image input from the image obtaining unit 111 is appropriate as the first image.

In Step S132, the camera position determining unit 114 determines whether the computed determination index satisfies a predetermined condition. When the determination index satisfies the condition, the process of step S133 is performed. Meanwhile, when the determination index does not satisfy the condition, the camera position determining unit 114 registers "False" in the selection flag field of the record that is registered in the position and attitude information table 133 in step S12. Then, the process of step S11 is performed again.

The following determination indexes I1 to I3 may be applied as examples of the determination index computed in step S13.

Determination Index I1: Average Value of Position and Attitude Difference

The determination index I1 is an index that indicates whether the movement of the camera 108 is similar to a stopped state based on the amount of movement from the position of capture of the captured image at a past time to the position of capture of the captured image at the current time. When the camera 108 is moved at a certain speed or more, an error in the computed position and attitude information may be increased. Using the determination index I1 enables the input captured image to be determined to be appropriate as the first image when the camera 108 is determined to be in a substantially stopped state.

The determination index I1 is computed as the average value of the distance between the position of capture of the captured image at the current time and the position of capture of the captured image at a past time for a certain past period. The distance between the position of capture of the captured image at the current time and the position of capture of the captured image at a past time is obtained as the inter-vector distance (Euclidean distance) between the translation vectors T based on each captured image. When the determination index I1 is less than or equal to a predetermined threshold $\sigma_{11}$, the camera 108 is determined to be in a substantially stopped state.

Determination Index I2: Amount of Deviation of Marker

The determination index I2 is an index that indicates how far the position of the marker 250 in the input captured image is deviated from the center of the captured image. When the marker 250 is captured near the peripheral portion of the captured image, the position of the camera 108 is moved. Afterward, the marker 250 may probably be out of the frame, and the second image may not be selected. In addition, when the captured image in which the marker 250 is captured near the peripheral portion is selected as the first image, the overlapping area between the first image and the second image that is subsequently selected may probably be small. Using the determination index I2 enables the captured image to be determined to be appropriate as the first image when the position of the marker 250 is near the center of the captured image.

The camera position determining unit 114 computes the coordinates of the centroid of the marker 250 in the captured image from the coordinates of the four vertices of the marker 250 in the captured image. Then, the camera position determining unit 114 computes the distance between the computed coordinates of the centroid and the coordinates of the central pixel of the captured image as the determination index I2. When the determination index I2 is less than or equal to a predetermined threshold $\sigma_{12}$, the marker 250 is determined to be captured at a position close to the center of the captured image.

Determination Index I3: Area of Marker

The determination index I3 indicates the area of the marker 250 in the input captured image. When the area of the marker 250 in the captured image is excessively great, an error in the computed position and attitude information may be increased. In addition, it is hard to extract feature points from the area other than the marker 250. Meanwhile, when the area of the marker 250 in the captured image is excessively small, an error in the computed position and attitude information may also be increased. Using the determination index I3 enables the captured image to be determined to be appropriate as the first image when the area of the marker 250 in the captured image is within a certain range.

The determination index I3 is computed from the coordinates of the four vertices of the marker 250 in the captured image. When the determination index I3 is greater than or equal to a predetermined threshold $\sigma_{13}$ and is less than or equal to a predetermined threshold $\sigma_{14}$ (where $\sigma_{13} < \sigma_{14}$), the area of the marker 250 is determined to be appropriate.

In step S131, only one of the above determination indexes I1 to I3 may be computed, or two or more may be computed. When two or more are computed, a condition is determined to be satisfied in step S132 when determination results based on two determination indexes both indicate that the captured image is appropriate as the first image, and the process proceeds to step S133. For example, the condition is determined to be satisfied when all of the determination indexes I1 to I3 are used, the determination index I1 is less than or equal to the threshold $\sigma_{11}$, the determination index I2 is less than or equal to the threshold $\sigma_{12}$, and the determination index I3 is greater than or equal to the threshold $\sigma_{13}$ and is less than or equal to the threshold $\sigma_{14}$.

In Step S133, the camera position determining unit 114 extracts multiple feature points from the input captured image. A method for extracting feature points is as described in the above section (2).

In Step S134, the camera position determining unit 114 determines whether the number of extracted feature points is greater than or equal to the predetermined threshold $\sigma_{14}$. As described above, since the three-dimensional coordinates of a corresponding feature point may not be computed when the number of corresponding feature points is less than eight, the threshold $\sigma_{14}$ is set to be greater than or equal to eight. When the number of feature points is greater than or equal to the threshold $\sigma_{14}$, the process of step S135 is performed. Meanwhile, when the number of feature points is less than the threshold $\sigma_{14}$, the camera position determining unit 114 registers "False" in the selection flag field of the record that is registered in the position and attitude information table 133 in step S12. Then, the process of step S11 is performed again.

In Step S135, the camera position determining unit 114 stores the input captured image as the first image on the storage unit 130. In addition, the camera position determining unit 114 registers "True" in the selection flag field of the record that is registered in the position and attitude information table 133 in step S12. Furthermore, the camera position determining unit 114 creates records that correspond to each feature point extracted in step S133 in the feature point information table 134 and assigns a feature point number to each record. The camera position determining unit 114 registers the coordinates of a corresponding feature point in the field of the coordinates in the first image in each record. Afterward, the process of step S18 is performed.

Fifth Process Example

A fifth process example is configured to be capable of registering the newly computed three-dimensional coordinates of a feature point on the previously created feature point map 131. Hereinafter, only a part of the fifth process example that is different from the first to the fourth process examples will be described.

Figure 14:
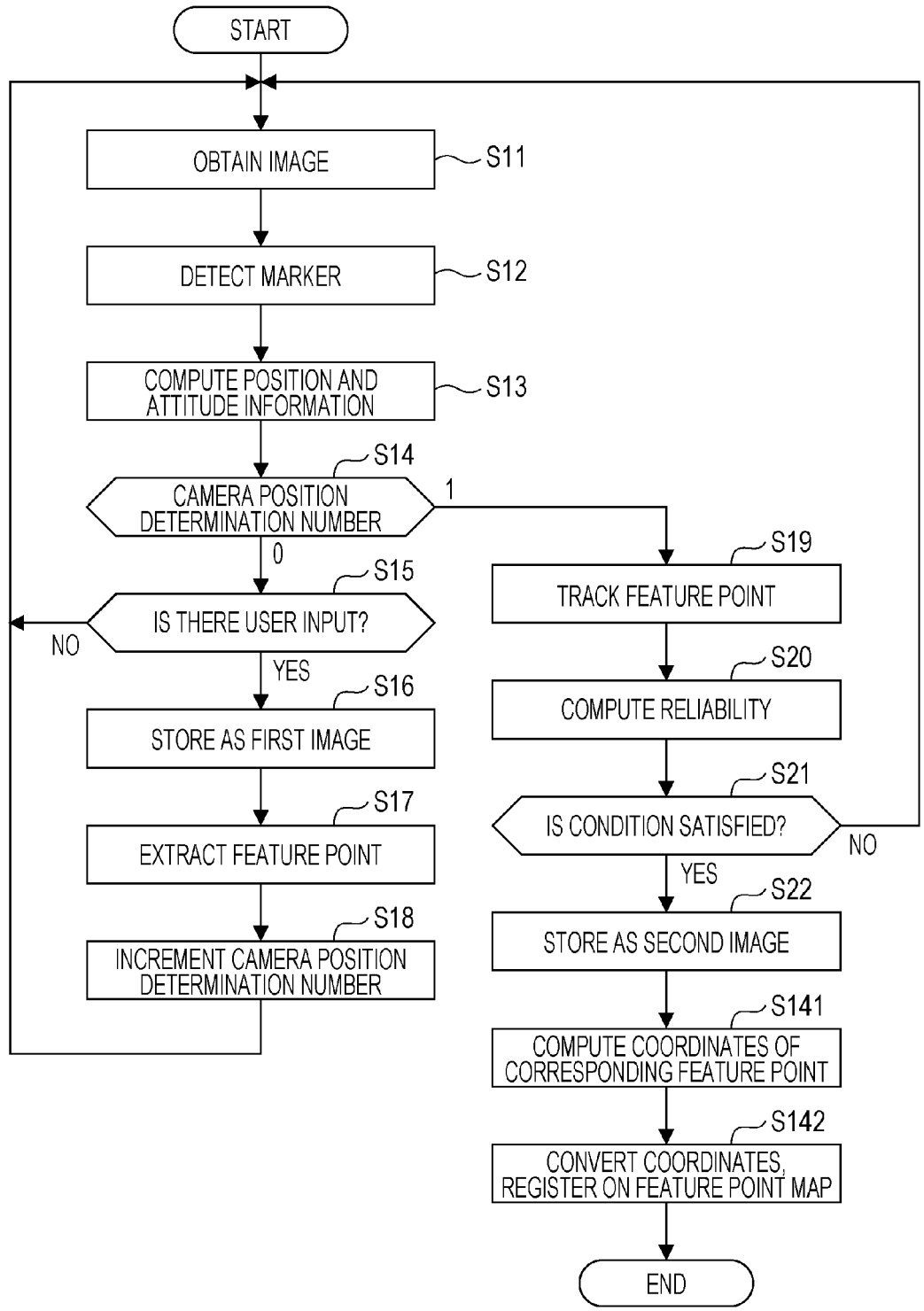
FIG. 14 is a flowchart illustrating a procedure of a fifth process example.

FIG. 14 is a flowchart illustrating a procedure of the fifth process example. The process of FIG. 14 is configured by replacing step S23 in FIG. 8 with steps S141 and S142. Instead of FIG. 8, step S23 in FIG. 13 may also be replaced with steps S141 and S142.

In Step S141, the three-dimensional reconstructing unit 115, in the same procedure as step S23 in FIG. 8, computes the three-dimensional coordinates of each feature point that corresponds to the record in which the tracking flag is "True" in the feature point information table 134.

In Step S142, the three-dimensional coordinates of a feature point computed in step S141 are coordinate values with the position of capture of the most recently selected first image as the reference. The three-dimensional coordinates registered on the previously created feature point map 131 are coordinate values with the position of capture of the first image that is different from the most recently selected one as the reference. That is, the three-dimensional coordinates of a feature point computed in step S141 and the three-dimensional coordinates registered on the previously created feature point map 131 are coordinate values in different coordinate systems. Thus, it may be appropriate to transform the coordinate values computed in step S141 so as to register the three-dimensional coordinates of a feature point computed in step S141 on the previously created feature point map 131.

The position and attitude information that is based on the first image which corresponds to the previously created feature point map 131 is given ($t_b$, $r_b$), and the position and attitude information that is based on the most recently selected first image is given ($t_c$, $r_c$). Attitude matrices $P_b$ and $P_c$ of four rows and four columns are obtained for each of the position and attitude information ($t_b$, $r_b$) and the position and attitude information ($t_c$, $r_c$) by using the above-described Equation (14) and Equation (15). A relative attitude matrix $P_r$ of the position of capture of the first image, which corresponds to the previously created feature point map 131, when viewed from the position of capture of the most recently selected first image is obtained by the following Equation (18).

$$P_r = P_c^{-1} P_b \quad (18)$$

Given that the three-dimensional coordinates of a feature point computed in step S141 are $X_n$, and the three-dimensional coordinates after transformed are $X_n'$, the three-dimensional reconstructing unit 115 computes the transformed three-dimensional coordinates $X_n'$ by the following Equation (19).

$$X_n' = P_r X_n \quad (19)$$

The three-dimensional reconstructing unit 115 registers the transformed three-dimensional coordinates on the feature point map 131. Accordingly, the three-dimensional coordinates in the feature point map 131 may be consistent with the newly computed three-dimensional coordinates.

The process functions of the apparatus (the three-dimensional coordinate computing apparatus 1 and the terminal apparatus 100) illustrated in the above each embodiment may be realized by a computer. In this case, the above process functions are realized on the computer by providing a program in which the content of processes for the functions that each apparatus is to have is written and executing the program by the computer. The program in which the content of processes is written may be recorded on a computer-readable recording medium. Examples of the computer-readable recording medium include a magnetic storage device, an optical disc, a magneto-optical disc, and a semiconductor memory. The magnetic storage device is, for example, a hard disk drive (HDD), a flexible disk (FD), or a magnetic tape. The optical disc is, for example, a digital versatile disc (DVD), a DVD-RAM, a compact disc read-only memory (CD-ROM), or a compact disc recordable/rewritable (CD-R/RW). The magneto-optical recording medium is, for example, a magneto-optical disk (MO).

In the case of distributing the program, for example, a portable recording medium such as a DVD and a CD-ROM on which the program is recorded is sold. It is also possible to store the program on a storage device of a server computer and transfer the program from the server computer to another computer through a network.

The computer executing the program, for example, stores the program recorded on the portable recording medium or the program transferred from the server computer on a storage device of the computer. Then, the computer reads the program from the storage device and performs processes according to the program. The computer may also read the program directly from the portable recording medium and perform processes according to the program. In addition, each time the program is transferred from the server computer that is connected to the computer through the network, the computer may sequentially perform processes according to the received program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A three-dimensional coordinate computing apparatus comprising:
    a memory;
    at least one processor, coupled to the memory, configured to cause the following to be performed:
    selecting a first selected image from multiple captured images, the multiple captured images being captured by a camera, the first selected image including feature points;
    determining a position of capture of the first selected image based on a position of a marker in the first selected image;
    determining a position of capture of each of multiple subsequent images based on a position of the marker in each of the multiple subsequent images, the multiple subsequent images being captured by the camera after the first selected image has been captured and the multiple subsequent images each including feature points;
    determining distances between the position of capture of the first selected image and the position of capture of each of the multiple subsequent images;
    determining a number of corresponding feature points between the feature points extracted from the first selected image and the feature points extracted from each of the multiple subsequent images;
    selecting a second selected image from the multiple subsequent images based on the determined distance of the second selected image and when the determined number of corresponding feature points of the second selected image are greater than a predetermined threshold; and
    outputting three-dimensional coordinates of the corresponding feature points based on two-dimensional coordinates of each corresponding feature point in each of the first selected image and the second selected image;
    registering the outputted three-dimensional coordinates on a feature point map;
    displaying superimposed image information based on the feature point map,
    wherein when selecting one subsequent image among the multiple subsequent images as the second selected image, the processor is further configured to cause the following to be performed:
    determining a camera-marker distance corresponding to a distance between the position of capture of the one subsequent image and the marker based on the position of the marker in the first selected image and the position of the marker of the one subsequent image,
    determining a distance threshold based on the camera-marker distance and an initial value of a reference inter-camera distance, and
    determining whether to select the one subsequent image as the second selected image based on a result of comparison between the distance between positions of capture that is computed for the one subsequent image and the distance threshold.

2. The three-dimensional coordinate computing apparatus according to claim 1,
    wherein the distance threshold is determined further based on an optimum value of an amount of movement of a pixel and a focal length of the camera.

3. The three-dimensional coordinate computing apparatus according to claim 1,
    wherein the processor is further configured to cause the following to be performed:
    determining an evaluation value that evaluates whether an operation in which a position of the camera is not changed from the capture of the first selected image until the capture of each of the multiple subsequent images,
    rotating the camera around a direction of capture, based on the position of the marker in the first selected image and the position of the marker of each of the multiple subsequent images,
    determining, when the evaluation value is greater than a predetermined threshold, that a subsequent image that corresponds to the evaluation value among the multiple subsequent images is not selected as the second selected image, and outputting notification information that notifies a user so as to move the position of capture.

4. The three-dimensional coordinate computing apparatus according to claim 1, wherein the processor is further configured to cause the following to be performed: determining whether to select a second captured image as the first selected image, based on an amount of movement from a position of capture of a first captured image among the multiple captured images to a position of capture of the second captured image among the multiple captured images.

5. The three-dimensional coordinate computing apparatus according to claim 1, wherein the processor is further configured to cause the following to be performed:

determining whether to select a second captured image as the first selected image, based on an amount of deviation between the position of the marker in a first captured image among the multiple captured images and the position of the marker in the second captured image among the multiple captured images.

6. The three-dimensional coordinate computing apparatus according to claim 1, wherein the processor is further configured to cause the following to be performed:

determining whether to select the one captured image as the first selected image, based on an area of the marker in one captured image among the multiple captured images.

7. A three-dimensional coordinate computing method comprising:

selecting, by a computer, a first selected image from multiple captured images, the multiple captured images being captured by a camera, the first selected image including feature points; determining a position of capture of the first selected image based on a position of a marker in the first selected image;

determining a position of capture of each of multiple subsequent images based on a position of the marker in each of the multiple subsequent images, the multiple subsequent images being captured by the camera after the first selected image has been captured and the multiple subsequent images each including feature points;

determining distances between the position of capture of the first selected image and the position of capture of each of the multiple subsequent images;

determining a number of corresponding feature points between the feature points extracted from the first selected image and the feature points extracted from each of the multiple subsequent images;

selecting a second selected image from the multiple subsequent images based on the determined distance of the second selected image and when the determined number of corresponding feature points of the second selected image are greater than a predetermined threshold; and outputting three-dimensional coordinates of the corresponding feature points based on two-dimensional coordinates of each corresponding feature point in each of the first selected image and the second selected image;

registering the outputted three-dimensional coordinates on a feature point map;

displaying superimposed image information based on the feature point map, wherein when selecting one subsequent image among the multiple subsequent images as the second selected image, the processor is further configured to cause the following to be performed:

determining a camera-marker distance corresponding to a distance between the position of capture of the one subsequent image and the marker based on the position of the marker in the first selected image and the position of the marker of the one subsequent image, determining a distance threshold based on the camera-marker distance and an initial value of a reference inter-camera distance, and determining whether to select the one subsequent image as the second selected image based on a result of comparison between the distance between positions of capture that is computed for the one subsequent image and the distance threshold.

8. The three-dimensional coordinate computing method according to claim 7, wherein the distance threshold is determined further based on an optimum value of an amount of movement of a pixel and a focal length of the camera.

9. A non-transitory computer readable recording medium having therein a program for causing a computer to execute a process for computing a three-dimensional coordinate, the process comprising:

selecting a first selected image from multiple captured images that are captured by a camera, the first selected image including feature points;

determining a position of capture of the first selected image based on a position of a marker in the first selected image;

determining a position of capture of each of multiple subsequent images based on a position of the marker in each of the multiple subsequent images, the multiple subsequent images being captured by the camera after the first selected image has been captured and the multiple subsequent images each including feature points;

determining distances between the position of capture of the first selected image and the position of capture of each of the multiple subsequent images;

determining a number of corresponding feature points between the feature points extracted from the first selected image and the feature points extracted from each of the multiple subsequent images;

selecting a second selected image from the multiple subsequent images based on the determined distance of the second selected image and when the determined number of corresponding feature points of the second selected image are greater than a predetermined threshold; and outputting three-dimensional coordinates of the corresponding feature points based on two-dimensional coordinates of each corresponding feature point in each of the first selected image and the second selected image, wherein when selecting one subsequent image among the multiple subsequent images as the second selected image, the processor is further configured to cause the following to be performed:

determining a camera-marker distance corresponding to a distance between the position of capture of the one subsequent image and the marker based on the position of the marker in the first selected image and the position of the marker of the one subsequent image, determining a distance threshold based on the camera-marker distance and an initial value of a reference inter-camera distance, and determining whether to select the one subsequent image as the second selected image based on a result of comparison between the distance between positions of capture that is computed for the one subsequent image and the distance threshold.

10. The non-transitory computer readable recording medium according to claim 9, wherein the distance threshold is determined further based on an optimum value of an amount of movement of a pixel and a focal length of the camera.

* * * * *